(12) United States Patent
Noguchi

(10) Patent No.: US 12,527,547 B2
(45) Date of Patent: Jan. 20, 2026

(54) ULTRASOUND DIAGNOSTIC APPARATUS AND METHOD FOR CONTROLLING ULTRASOUND DIAGNOSTIC APPARATUS

(71) Applicant: FUJIFILM Corporation, Tokyo (JP)

(72) Inventor: Masafumi Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 28 days.

(21) Appl. No.: 18/496,812

(22) Filed: Oct. 27, 2023

(65) Prior Publication Data

US 2024/0050071 A1 Feb. 15, 2024

Related U.S. Application Data

(63) Continuation of application No. PCT/JP2022/016591, filed on Mar. 31, 2022.

(30) Foreign Application Priority Data

Apr. 30, 2021 (JP) ................................ 2021-077574

(51) Int. Cl.
*A61B 8/00* (2006.01)
*A61B 8/08* (2006.01)

(52) U.S. Cl.
CPC .............. *A61B 8/483* (2013.01); *A61B 8/42* (2013.01); *A61B 8/4488* (2013.01); *A61B 8/466* (2013.01)

(58) Field of Classification Search
CPC ......... A61B 8/483; A61B 8/42; A61B 8/4488; A61B 8/466; A61B 8/4494; A61B 8/54;
(Continued)

(56) References Cited

U.S. PATENT DOCUMENTS

| 6,089,096 A * | 7/2000 | Alexandru ........ G01S 15/8925 73/625 |
| 2002/0022780 A1* | 2/2002 | Kawagishi ........ G01S 7/52039 600/458 |

(Continued)

FOREIGN PATENT DOCUMENTS

| EP | 1312074 B1 * | 4/2007 | ............... A61B 8/06 |
| EP | 3553785 A1 * | 10/2019 | ........... A61B 6/5223 |

(Continued)

OTHER PUBLICATIONS

The extended European search report issued by the European Patent Office on Sep. 11, 2024, which corresponds to European Patent Application No. 22795517.6-1206 and is related to U.S. Appl. No. 18/496,812.
International Search Report issued in PCT/JP2022/016591; mailed Jun. 21, 2022.

(Continued)

*Primary Examiner* — Alexei Bykhovski
(74) *Attorney, Agent, or Firm* — Studebaker Brackett PLLC

(57) ABSTRACT

Provided are an ultrasound diagnostic apparatus and a method for controlling the ultrasound diagnostic apparatus capable of improving image qualities of a two-dimensional ultrasound image and a three-dimensional ultrasound image. An ultrasound diagnostic apparatus (1) includes an ultrasound probe (2) and an apparatus main body (3). The ultrasound probe (2) includes a two-dimensional transducer array (11) including a plurality of transducers, a patch division circuit (12) that divides at least a part of the transducers into a plurality of patches in which the transducers are arranged in an elevation direction in a case of performing the two-dimensional scanning and divides at least a part of the transducers into a plurality of patches in which the transducers are arranged in an azimuth direction in a case of performing the three-dimensional scanning, and a plurality of probe beam formers (13) corresponding to the plurality of patches. The apparatus main body (3) includes a main body beam former (25). The probe beam formers (13) perform beam forming on transmission and reception signals for the transducers in the patches, and the main body beam former (25) performs beam forming on the transmission and reception signals for the plurality of patches.

21 Claims, 9 Drawing Sheets

(58) Field of Classification Search
CPC ............. G01S 7/52026; G01S 7/52047; G01S 7/5208; G01S 7/52085; G01S 15/8925; G01S 15/8927; G01S 15/8993
See application file for complete search history.

(56) References Cited

U.S. PATENT DOCUMENTS

| | | | |
|---|---|---|---|
| 2015/0085617 A1* | 3/2015 | Savord | ................ G01S 15/8925 367/138 |
| 2015/0241397 A1* | 8/2015 | Savord | .................. G01N 29/24 600/459 |
| 2018/0003810 A1 | 1/2018 | Freeman et al. | |
| 2019/0083064 A1* | 3/2019 | Nguyen | ................ G01S 7/5208 |
| 2021/0124042 A1* | 4/2021 | Fish | ...................... B06B 1/0207 |
| 2021/0251601 A1* | 8/2021 | Han | ...................... A61B 8/085 |

FOREIGN PATENT DOCUMENTS

| | | |
|---|---|---|
| JP | 2008-307085 A | 12/2008 |
| JP | 2017-185085 A | 10/2017 |
| JP | 2018-503459 A | 2/2018 |
| JP | 2019-509856 A | 4/2019 |

OTHER PUBLICATIONS

International Preliminary Report On Patentability (Chapter I) and Written Opinion of the International Searching Authority issued in PCT/JP2022/016591; issued Oct. 24, 2023.

* cited by examiner

ULTRASOUND DIAGNOSTIC APPARATUS AND METHOD FOR CONTROLLING ULTRASOUND DIAGNOSTIC APPARATUS

CROSS-REFERENCE TO RELATED APPLICATIONS

This application is a Continuation of PCT International Application No. PCT/JP2022/016591 filed on Mar. 31, 2022, which claims priority under 35 U.S.C. § 119(a) to Japanese Patent Application No. 2021-077574 filed on Apr. 30, 2021. The above applications are hereby expressly incorporated by reference, in their entirety, into the present application.

BACKGROUND OF THE INVENTION

1. Field of the Invention

The present invention relates to an ultrasound diagnostic apparatus that performs both two-dimensional scanning and three-dimensional scanning and a method for controlling the ultrasound diagnostic apparatus.

2. Description of the Related Art

In the related art, an ultrasound diagnostic apparatus comprising an ultrasound probe including a two-dimensional transducer array in which a plurality of transducers are arranged in each of a so-called azimuth direction and a so-called elevation direction has been known. In general, since the two-dimensional transducer array includes a very large number of transducers, it is difficult to draw a signal line from all the transducers of the two-dimensional transducer array to an apparatus main body. As a result, it is difficult to perform beam forming individually for all the transducers of the two-dimensional transducer array. Therefore, in many cases, a plurality of transducers are controlled as one control unit, that is, as one patch.

In general, the plurality of transducers constituting the two-dimensional transducer array are divided into a plurality of patches having a plurality of transducers in each of the azimuth direction and the elevation direction, and beam forming is often performed on a transmission signal and a reception signal of each patch, which has been a factor that deteriorates an image quality of a two-dimensional ultrasound image obtained by two-dimensional scanning. Therefore, in order to improve the image quality of the two-dimensional ultrasound image, an ultrasound diagnostic apparatus as disclosed in JP2019-509856A has been developed. In JP2019-509856A, a row of transducers in the elevation direction of the two-dimensional transducer array, that is, 1×N transducers are controlled as one patch, where the number of transducers in the elevation direction of the two-dimensional transducer array is N.

SUMMARY OF THE INVENTION

The image quality of the two-dimensional ultrasound image can be improved by using the technique of JP2019-509856A. However, in a case where three-dimensional scanning is performed using the patch disclosed in JP2019-509856A, a so-called grating lobe is likely to be generated. As a result, so-called grating lobe artifacts are likely to be generated in an obtained three-dimensional ultrasound image, which causes a problem in that a three-dimensional ultrasound image having a low image quality is obtained.

The present invention has been made in order to solve such a problem in the related art, and an object of the present invention is to provide an ultrasound diagnostic apparatus and a method for controlling the ultrasound diagnostic apparatus, which can improve image qualities of a two-dimensional ultrasound image and a three-dimensional ultrasound image.

In order to achieve the above object, an ultrasound diagnostic apparatus according to an aspect of the present invention is an ultrasound diagnostic apparatus that performs both two-dimensional scanning and three-dimensional scanning and comprises an ultrasound probe; and an apparatus main body connected to the ultrasound probe, in which the ultrasound probe includes a two-dimensional transducer array in which a plurality of transducers are arranged in each of an elevation direction and an azimuth direction, a patch division circuit that divides a plurality of transducers, which are at least a part of the two-dimensional transducer array, into a plurality of patches in which two or more transducers are arranged in the elevation direction, respectively, in a case of performing the two-dimensional scanning and divides a plurality of transducers, which are at least a part of the two-dimensional transducer array, into a plurality of patches in which two or more transducers are arranged in the azimuth direction, respectively, in a case of performing the three-dimensional scanning, and a plurality of probe beam formers corresponding to the plurality of patches divided by the patch division circuit, the apparatus main body includes a main body beam former connected to the plurality of probe beam formers of the ultrasound probe, the plurality of probe beam formers perform beam forming on transmission signals and reception signals for the two or more transducers in the plurality of patches, and the main body beam former performs beam forming on the transmission signals and the reception signals for the plurality of patches.

It is preferable that the main body beam former includes a transmission circuit and a reception circuit each connected to the plurality of probe beam formers, the apparatus main body includes an image generation unit connected to the reception circuit, in a case where ultrasound beams are transmitted from the plurality of transducers which are at least a part of the two-dimensional transducer array, the transmission signals are supplied from the transmission circuit to the two or more transducers in the plurality of patches via the plurality of probe beam formers, and in a case where ultrasound echoes are received by the plurality of transducers which are at least a part of the two-dimensional transducer array, the reception signals are supplied from the two or more transducers in the plurality of patches to the image generation unit via the plurality of probe beam formers and the reception circuit.

It is preferable that the image generation unit generates a two-dimensional ultrasound image based on the reception signals supplied via the reception circuit of the main body beam former by performing the two-dimensional scanning, and generates a three-dimensional ultrasound image based on the reception signals supplied via the reception circuit of the main body beam former by performing the three-dimensional scanning.

The ultrasound diagnostic apparatus can further comprise a sweep circuit that selects, as the plurality of transducers which are at least a part of the two-dimensional transducer array, a plurality of transducers included in an opening in which the transducers having a first transducer number equal to or smaller than the number of the transducers in the elevation direction of the two-dimensional transducer array are arranged in the elevation direction, and the transducers having a second transducer number smaller than the number of the transducers in the azimuth direction of the two-dimensional transducer array are arranged in the azimuth direction, in which the patch division circuit can perform division of the plurality of patches in the opening, and the two-dimensional scanning and the three-dimensional scanning can be performed using the transducers in the opening while sweeping the opening in the azimuth direction by the sweep circuit.

In a case where the first transducer number is M and the second transducer number is N, the patch division circuit can divide a plurality of transducers included in the opening into a plurality of the patches in which K (submultiple of M) transducers are arranged in the elevation direction, respectively, in a case where the two-dimensional scanning is performed, and can divide a plurality of transducers included in the opening into a plurality of the patches in which L (submultiple of N) transducers are arranged in the azimuth direction, respectively, in a case where the three-dimensional scanning is performed.

The plurality of probe beam formers can be connected to the patch division circuit, the patch division circuit can be connected to the sweep circuit, and the sweep circuit can be connected to the plurality of transducers of the two-dimensional transducer array and can directly select a plurality of transducers included in the opening from the plurality of transducers.

Alternatively, the sweep circuit can be connected to the plurality of probe beam formers, the plurality of probe beam formers can be connected to the patch division circuit, the patch division circuit can be connected to the plurality of transducers of the two-dimensional transducer array, and the sweep circuit can select a plurality of transducers included in the opening by selecting a part of the probe beam formers from the plurality of probe beam formers.

The main body beam former can perform beam forming for delaying the transmission signals and the reception signals for the plurality of patches such that ultrasonic waves transmitted and received from the two-dimensional transducer array are steered in the elevation direction in a case where the three-dimensional scanning is performed.

In this case, the main body beam former can perform beam forming on the transmission signals and the reception signals for the plurality of patches such that a range of steering angles of the ultrasonic waves is asymmetric in the elevation direction in a case where the three-dimensional scanning is performed.

In addition, the main beam former can perform beam forming on the transmission signals and the reception signals for the plurality of patches such that an interval between steering angles of the ultrasonic waves is changed according to absolute values of the steering angles in a case where the three-dimensional scanning is performed.

The apparatus main body can include a scanning control unit that controls scanning such that the two-dimensional scanning and the three-dimensional scanning are alternately performed.

In this case, the scanning control unit can divide a plurality of scanning lines in the three-dimensional scanning into a plurality of groups such that scanning lines adjacent to each other in the azimuth direction in the three-dimensional scanning belong to different groups in a case where the three-dimensional scanning is performed, control the plurality of probe beam formers such that scanning is performed for each of the divided groups, and switch the three-dimensional scanning to the two-dimensional scanning each time the three-dimensional scanning of at least one of the divided groups ends.

It is preferable that the two-dimensional transducer array has a width in the azimuth direction which is at least 2.5 times a width in the elevation direction.

The apparatus main body can include an input device for a user to perform an input operation, an observation target selection unit that selects an observation target based on the input operation of the user via the input device, and an observation target detection unit that detects the observation target selected by the observation target selection unit based on the reception signals supplied via the main body beam former by performing the three-dimensional scanning.

In this case, the image generation unit can generate the three-dimensional ultrasound image of the observation target by performing volume rendering on the observation target detected by the observation target detection unit.

The apparatus main body can include a monitor that displays the two-dimensional ultrasound image and the three-dimensional ultrasound image generated by the image generation unit, and the three-dimensional ultrasound image can be superimposed on the two-dimensional ultrasound image and displayed on the monitor.

In addition, the image generation unit can generate the three-dimensional ultrasound image by reducing the reception signals of a portion other than a portion corresponding to the observation target detected by the observation target detection unit.

The plurality of probe beam formers can perform beam forming on the transmission signals by adding delays to the transmission signals for the two or more transducers in the plurality of patches.

In addition, the plurality of probe beam formers can perform beam forming on the transmission signals by transmitting the transmission signals without delays added thereto to the two or more transducers in the plurality of patches.

In addition, the plurality of probe beam formers can perform beam forming on the reception signals by adding delays to the reception signals for the two or more transducers in the plurality of patches.

In addition, the plurality of probe beam formers can perform beam forming on the reception signals by transmitting the reception signals without delays added thereto, which are received from the two or more transducers in the plurality of patches, to the main body beam former.

A method for controlling an ultrasound diagnostic apparatus according another aspect to the present invention is a method for controlling an ultrasound diagnostic apparatus that includes an ultrasound probe including a two-dimensional transducer array in which a plurality of transducers are arranged in each of an elevation direction and an azimuth direction and an apparatus main body connected to the ultrasound probe and performs both two-dimensional scanning and three-dimensional scanning, the method comprising: dividing the plurality of transducers into a plurality of patches in which two or more transducers are arranged in the elevation direction, respectively, in a case of performing the two-dimensional scanning; dividing the plurality of transducers into a plurality of patches in which two or more transducers are arranged in the azimuth direction, respectively, in a case of performing the three-dimensional scanning; performing beam forming on transmission signals and reception signals for the two or more transducers in the plurality of patches in the ultrasound probe; and performing beam forming on the transmission signals and the reception signals for the plurality of patches in the apparatus main body.

According to the aspect of the present invention, the ultrasound diagnostic apparatus performs both two-dimensional scanning and three-dimensional scanning and comprises an ultrasound probe, and an apparatus main body connected to the ultrasound probe, in which the ultrasound probe includes a two-dimensional transducer array in which a plurality of transducers are arranged in each of an elevation direction and an azimuth direction, a patch division circuit that divides a plurality of transducers into a plurality of patches in which two or more transducers are arranged in the elevation direction, respectively, in a case of performing the two-dimensional scanning and divides a plurality of transducers into a plurality of patches in which two or more transducers are arranged in the azimuth direction, respectively, in a case of performing the three-dimensional scanning, and a plurality of probe beam formers corresponding to the plurality of patches divided by the patch division circuit, the apparatus main body includes a main body beam former connected to the plurality of probe beam formers of the ultrasound probe, the plurality of probe beam formers perform beam forming on transmission signals and reception signals for the two or more transducers in the plurality of patches, and the main body beam former performs beam forming on the transmission signals and the reception signals for the plurality of patches. Therefore, image qualities of the two-dimensional ultrasound image and the three-dimensional ultrasound image can be improved.

DESCRIPTION OF THE PREFERRED EMBODIMENTS

Hereinafter, embodiments of the present invention will be described with reference to the accompanying drawings.

The explanation of configuration requirements described below is based on representative embodiments of the present invention, but the present invention is not limited to such embodiments.

In addition, in the present specification, numerical ranges represented by using "to" mean ranges including numerical values described before and after "to" as a lower limit value and an upper limit value.

In the present specification, the terms "same" and "identical" include an error range generally allowed in the technical field.

Embodiment 1

Figure 1:
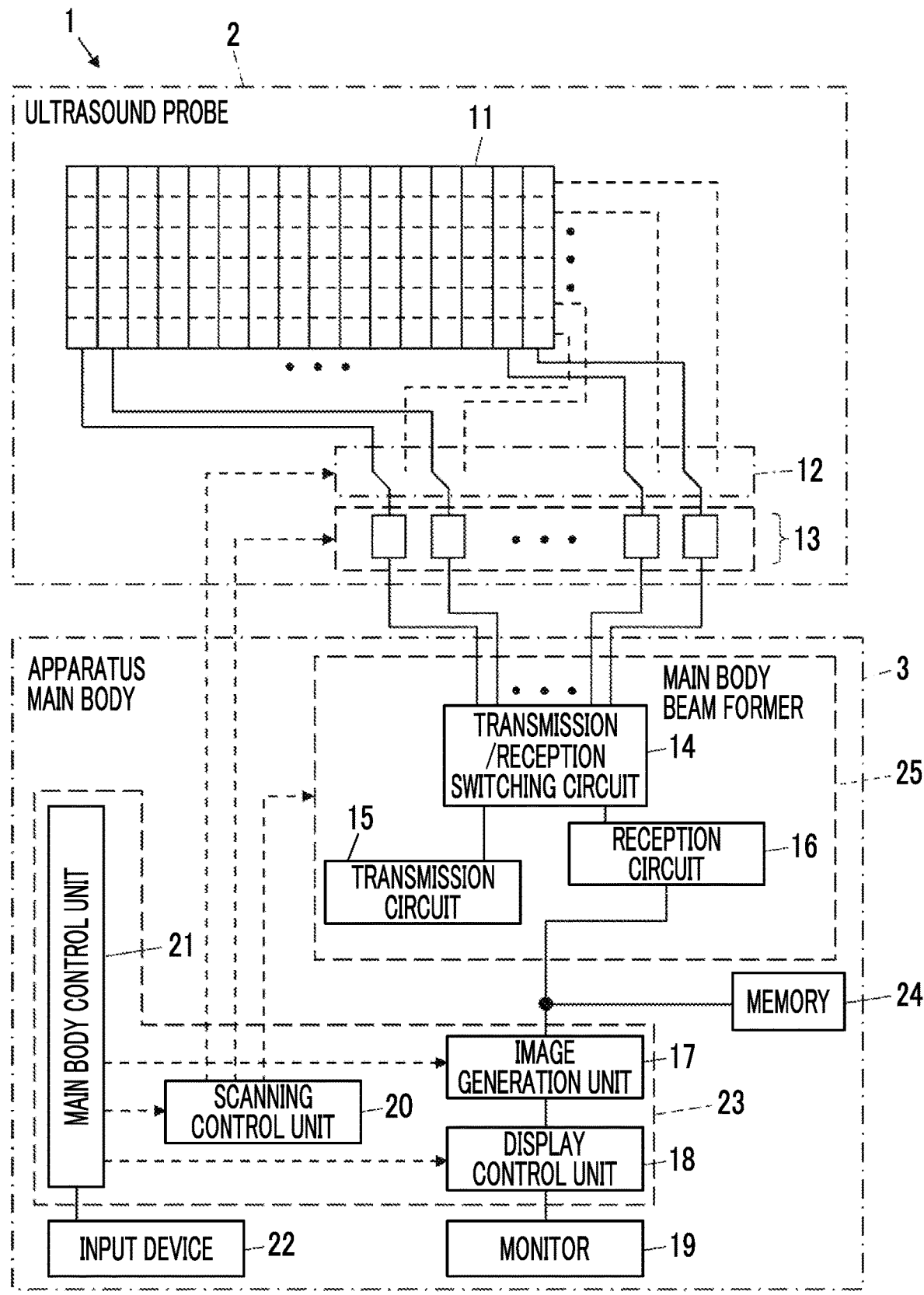
FIG. 1 is a block diagram showing a configuration of an ultrasound diagnostic apparatus according to Embodiment 1 of the present invention.

FIG. 1 shows a configuration of an ultrasound diagnostic apparatus 1 according to an embodiment of the present invention. The ultrasound diagnostic apparatus 1 comprises an ultrasound probe 2 and an apparatus main body 3 connected to the ultrasound probe 2. Although not shown, the ultrasound probe 2 and the apparatus main body 3 are connected to each other by a cable.

The ultrasound probe 2 comprises a two-dimensional transducer array 11. A patch division circuit 12 is connected to the two-dimensional transducer array 11. In addition, a plurality of probe beam formers 13 are connected to the patch division circuit 12. Although not shown, signal lines are drawn out of the plurality of probe beam formers 13, respectively. The plurality of signal lines extend to the apparatus main body 3 side through a cable that connects the ultrasound probe 2 and the apparatus main body 3 to each other.

The apparatus main body 3 comprises a transmission/reception switching circuit 14 connected to the plurality of probe beam formers 13 of the ultrasound probe 2 by a plurality of signal lines passing through the cable connecting the ultrasound probe 2 and the apparatus main body 3 to each other. A transmission circuit 15 and a reception circuit 16 are connected to the transmission/reception switching circuit 14. The transmission/reception switching circuit 14, the transmission circuit 15, and the reception circuit 16 constitute a main body beam former 25. An image generation unit 17, a display control unit 18, and a monitor 19 are sequentially connected to the reception circuit 16. Further, a memory 24 is connected to the reception circuit 16. In addition, the apparatus main body 3 comprises a scanning control unit 20 connected to the patch division circuit 12 and the plurality of probe beam formers 13 of the ultrasound probe 2, and the main body beam former 25 of the apparatus main body 3.

A main body control unit 21 is connected to the image generation unit 17, the display control unit 18, and the scanning control unit 20. In addition, an input device 22 is connected to the main body control unit 21.

In addition, the image generation unit 17, the display control unit 18, the scanning control unit 20, and the main body control unit 21 constitute a processor 23 for the apparatus main body 3.

Figure 2:
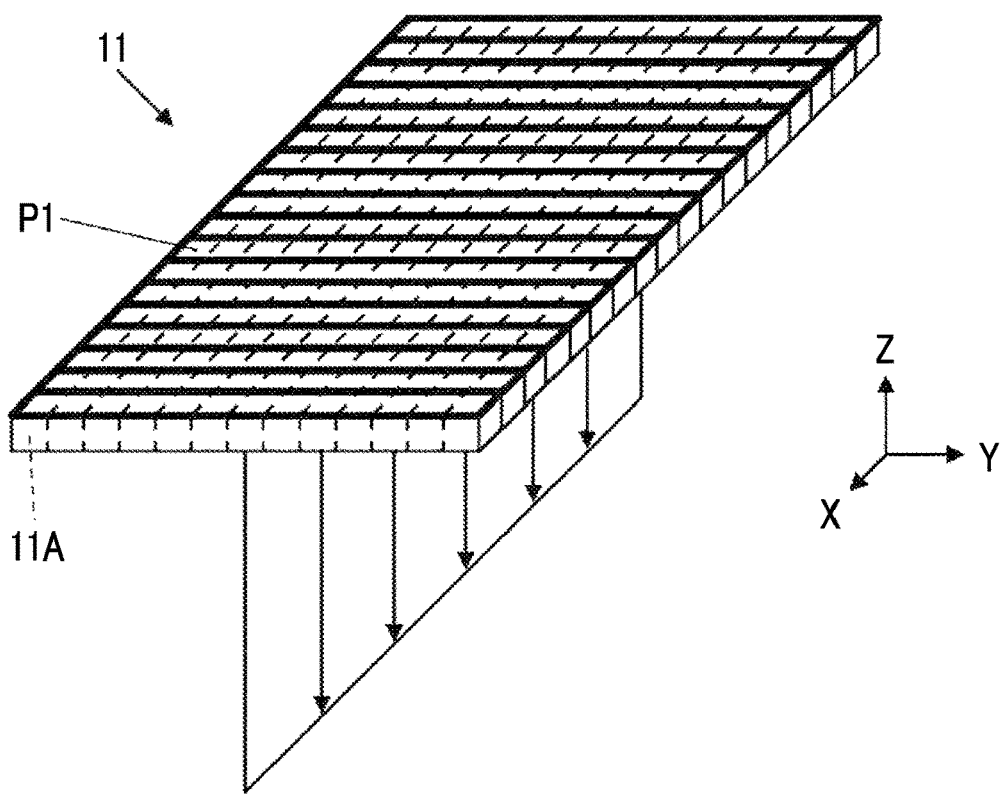
FIG. 2 is a diagram schematically showing an example of a patch for two-dimensional scanning in Embodiment 1 of the present invention.
Figure 3:
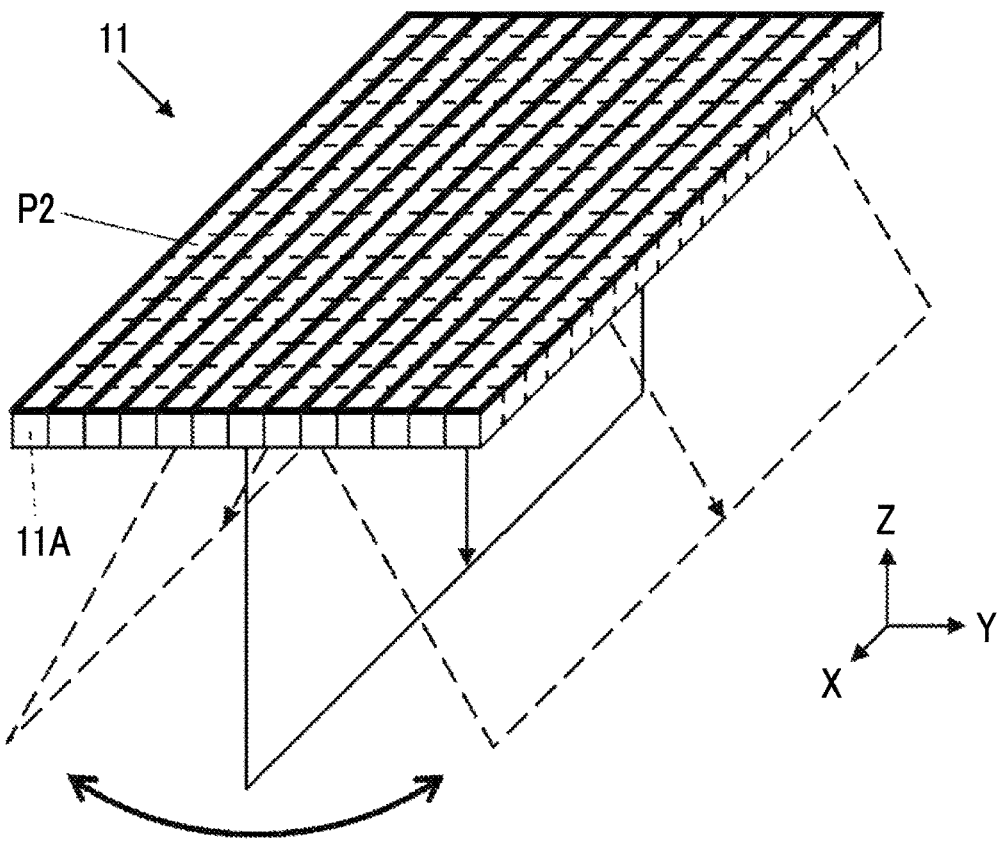
FIG. 3 is a diagram schematically showing an example of a patch for three-dimensional scanning in Embodiment 1 of the present invention.

As shown in FIGS. 2 and 3, for example, the two-dimensional transducer array 11 has a plurality of transducers 11A arranged in the elevation direction and the azimuth direction, respectively. Each of the transducers 11A transmits ultrasonic waves in response to transmission signals supplied from the transmission circuit 15, receives ultrasound echoes from a subject, and outputs a signal based on the ultrasound echoes. The transducer 11A is constituted by forming electrodes at both ends of a piezoelectric body composed of, for example, a piezoelectric ceramic represented by lead zirconate titanate (PZT), a polymeric piezoelectric element represented by polyvinylidene difluoride (PVDF), and a piezoelectric single crystal represented by lead magnesium niobate-lead titanate (PMN-PT).

In FIGS. 2 and 3, the azimuth direction is described as an X direction, and the elevation direction is described as a Y direction. Hereinafter, for the sake of description, the azimuth direction may be referred to as the X direction, and the elevation direction may be referred to as the Y direction. In addition, a direction orthogonal to both the azimuth direction and the elevation direction may be referred to as a Z direction.

In a case where two-dimensional scanning is performed, the patch division circuit 12 divides a plurality of transducers 11A (sub-array) which are at least a part of the transducers 11A of the two-dimensional transducer array 11 into a plurality of patches in each of which two or more transducers 11A are arranged in the elevation direction. In addition, in a case where three-dimensional scanning is performed, the patch division circuit 12 divides a plurality of transducers 11A (sub-array) which are at least a part of the transducers 11A of the two-dimensional transducer array 11 into a plurality of patches in each of which two or more transducers 11A are arranged in the azimuth direction.

For example, in a case where two-dimensional scanning is performed, the patch division circuit 12 can divide the plurality of transducers 11A into a plurality of the patches P1 in each of which a plurality of the transducers 11A are arranged in the elevation direction, as shown in FIG. 2. In addition, in a case where three-dimensional scanning is performed, the patch division circuit 12 can divide the plurality of transducers 11A into a plurality of the patches P2 in each of which a plurality of the transducers 11A are arranged in the azimuth direction, as shown in FIG. 3.

Here, for example, as shown in FIG. 2, the two-dimensional scanning is to obtain two-dimensional information about a tomographic plane of an observation target by scanning the tomographic plane of the observation target along one scanning surface.

Further, for example, as shown in FIG. 3, the three-dimensional scanning is to obtain three-dimensional information about an observation target by scanning a plurality of tomographic planes of the observation target along a plurality of scanning surfaces while steering the scanning surface in the elevation direction, that is, tilting the scanning surface in the elevation direction.

Further, the patch is a control unit of a plurality of the transducers 11A. The patch can include two or more transducers 11A.

For example, the patch P1 for two-dimensional scanning shown in FIG. 2 includes a plurality of the transducers 11A arranged in a row in the elevation direction in the two-dimensional transducer array 11, and the plurality of transducers 11A included in the patch P1 can be controlled collectively.

In addition, the patch P2 for three-dimensional scanning shown in FIG. 3 includes a plurality of the transducers 11A arranged in a row in the azimuth direction in the two-dimensional transducer array 11, and the plurality of transducers 11A included in the patch P2 can be controlled collectively.

The ultrasound probe 2 includes the probe beam formers 13 of which the number is smaller than the total number of the transducers 11A that constitute the two-dimensional transducer array 11.

The plurality of probe beam formers 13 correspond to a plurality of the patches P1 and P2 divided by the patch division circuit 12 and can perform beam forming on reception signals received from the plurality of transducers 11A included in each of the patches P1 and P2 and transmission signals supplied from the transmission circuit 15.

Here, the plurality of probe beam formers 13 can add a delay to each of the transmission signals such that ultrasound beams are transmitted in a specific direction from the transducers 11A of each of the patches P1 and P2, as beam forming for the transmission signals. In addition, the plurality of probe beam formers 13 can perform beam forming on the transmission signals such that ultrasound beams traveling straight in the Z direction are transmitted from the transducers 11A of each of the patches P1 and P2 without adding delays to the transmission signals, that is, by transmitting the transmission signals without delays added thereto to a plurality of the transducers 11A among the transducers 11A of the patches P1 and P2.

In addition, the plurality of probe beam formers 13 can add a delay to each of the reception signals such that the transducers 11A of each of the patches P1 and P2 receive ultrasound echoes propagating from a specific direction, as beam forming for the reception signals. In addition, the plurality of probe beam formers 13 can perform beam forming on the reception signals such that the transducers 11A of each of the patches P1 and P2 receive ultrasound echoes traveling straight in the Z direction without adding delays to the reception signals, that is, by transmitting the reception signals without delays added thereto as they are, which are received from a plurality of the transducers 11A in the patches P1 and P2, to the main body beam former 25.

The main body beam former 25 is connected to a plurality of the probe beam formers 13 via a plurality of signal lines (not shown) passing through the cable connecting the ultrasound probe 2 and the apparatus main body 3 to each other and performs beam forming on the transmission signals and the reception signals of a plurality of the patches P1 and P2 divided by the patch division circuit 12.

As shown in FIG. 1, the main body beam former 25 includes the transmission/reception switching circuit 14, the transmission circuit 15, and the reception circuit 16.

Figure 4:
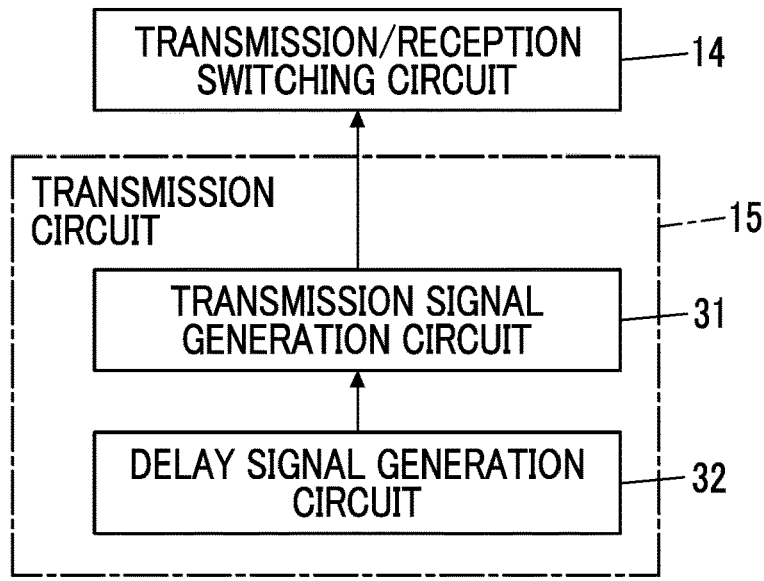
FIG. 4 is a block diagram showing a configuration of a transmission circuit in Embodiment 1 of the present invention.

The transmission circuit 15 performs beam forming on the transmission signals of the patches P1 and P2 under the control of the scanning control unit 20 and transmits the transmission signals to the two-dimensional transducer array 11 via the transmission/reception switching circuit 14, the plurality of probe beam formers 13, and the patch division circuit 12. As shown in FIG. 4, the transmission circuit 15 includes a transmission signal generation circuit 31 connected to the transmission/reception switching circuit 14 and a delay signal generation circuit 32 connected to the transmission signal generation circuit 31.

The delay signal generation circuit 32 generates a transmission delay signal for adding a delay to a timing at which each of the transducers 11A of the transducer array 11 is driven such that the ultrasonic wave transmitted from the transducer array 11 converges to a position corresponding to a transmission focal length, that is, for performing beam forming on the transmission signal, under the control of the scanning control unit 20.

The transmission signal generation circuit 31 includes, for example, a plurality of pulse generators, and generates a transmission signal which is a drive signal for the plurality of transducers 11A based on the transmission delay signal generated by the delay signal generation circuit 32, under the control of the scanning control unit 20. In this way, the transmission signal generation circuit 31 generates the transmission signal subjected to beam forming in accordance with the transmission delay signal. The transmission signal generation circuit 31 supplies the transmission signal to the plurality of transducers 11A of the two-dimensional transducer array 11 via the transmission/reception switching circuit 14, the plurality of probe beam formers 13, and the patch division circuit 12. In this way, in a case where a pulsed or continuous wave voltage is applied to electrodes of the plurality of transducers 11A of the two-dimensional transducer array 11, the piezoelectric body expands and contracts, pulsed or continuous wave ultrasonic waves are generated from the transducers 11A, and an ultrasound beam is formed from a composite wave of the ultrasonic waves.

The reception circuit 16 performs beam forming on the reception signals of the patches P1 and P2, that is, the reception signals received from the plurality of probe beam formers 13 via the transmission/reception switching circuit 14, under the control of the scanning control unit 20.

Figure 5:
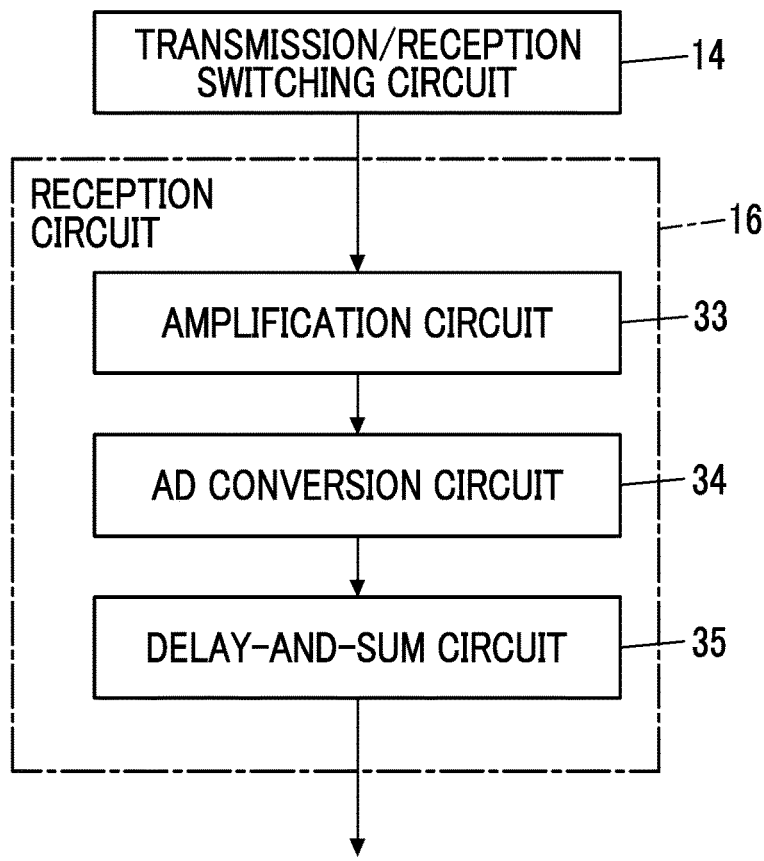
FIG. 5 is a block diagram showing a configuration of a reception circuit in Embodiment 1 of the present invention.

As shown in FIG. 5, the reception circuit 16 includes an amplification circuit 33 connected to the transmission/reception switching circuit 14, an analog-digital (AD) conversion circuit 34 connected to the amplification circuit 33, and a delay-and-sum circuit 35 connected to the AD conversion circuit 34.

The amplification circuit 33 amplifies the reception signal input from each of the transducers 11A that constitute the two-dimensional transducer array 11 and transmits the amplified reception signal to the AD conversion circuit 34.

The AD conversion circuit 34 converts the reception signal transmitted from the amplification circuit 33 into a digital format.

Under the control of the scanning control unit 20, the delay-and-sum circuit 35 adds a delay to each of the reception signals converted into a digital format by the AD conversion circuit 34 so as to converge the ultrasound echo reflected at each of observation points in the subject, and adds and combines the reception signals to which the delay is added for each of the observation points. Accordingly, beam forming of the reception signals of the patches P1 and P2 is performed.

Under the control of the scanning control unit 20, the transmission/reception switching circuit 14 switches between a state in which the plurality of probe beam formers 13 and the transmission circuit 15 are connected to each other and a state in which the plurality of probe beam formers 13 and the reception circuit 16 are connected to each other. The transmission/reception switching circuit 14 takes a state in which the plurality of probe beam formers 13 and the transmission circuit 15 are connected to each other in a case where the transmission circuit 15 performs beam forming on the transmission signals of the patches P1 and P2, and takes a state in which the plurality of probe beam formers 13 and the reception circuit 16 are connected to each other in a case where the reception circuit 16 performs beam forming on the reception signals of the patches P1 and P2.

Here, the total number of the plurality of probe beam formers 13 is smaller than the total number of the transducers 11A constituting the two-dimensional transducer array 11. Therefore, the number of the plurality of signal lines connected to the main body beam former 25 through the cable is also smaller than the total number of the transducers 11A constituting the two-dimensional transducer array 11. In addition, the main body beam former 25 may or may not add delays to the transmission signals in a case of performing beam forming on the transmission signals of the plurality of patches P1 and P2. In addition, the main body beam former 25 may or may not add delays to the reception signals in a case of performing beam forming on the reception signals of a plurality of the patches P1 and P2.

By the way, in general, since a two-dimensional transducer array includes a very large number of transducers, it has been difficult to draw signal lines from all the transducers of the two-dimensional transducer array to the apparatus main body. Therefore, in an ultrasound diagnostic apparatus having a two-dimensional transducer array, a plurality of transducers constituting the two-dimensional transducer array are often divided into a plurality of patches having a plurality of transducers in each of the azimuth direction and the elevation direction.

In a case where two-dimensional scanning is performed by performing beam forming on the reception signals and the transmission signals of such patches, the number of patches in the azimuth direction is smaller than the number of transducers in the azimuth direction included in the two-dimensional transducer array. Therefore, there is a problem in that an image quality of the obtained two-dimensional ultrasound image is deteriorated as compared with a case where beam forming is performed on the transmission signals and the reception signals of all the transducers in the azimuth direction included in the two-dimensional transducer array.

The patch P1 for two-dimensional scanning divided by the patch division circuit 12 as shown in FIG. 2 has one transducer 11A in the azimuth direction and has the same number of the transducers 11A in the elevation direction as the number of the transducers 11A in the elevation direction of the two-dimensional transducer array 11. Therefore, the number of the patches P1 in the azimuth direction is the same as the number of the transducers 11A in the azimuth direction included in the two-dimensional transducer array 11. In a case where beam forming is performed on the transmission signals and the reception signals of a plurality of the patches P1 by the main body beam former 25, the transmission signals and the reception signals of the respective transducers 11A in the azimuth direction of the two-dimensional transducer array 11 are subjected to the beam forming. Therefore, even in a case where all the transducers 11A of the two-dimensional transducer array 11 and the main body beam former 25 cannot be directly connected by a plurality of signal lines, a high-quality two-dimensional ultrasound image can be obtained.

In general, in a case where the scanning surface is steered in the elevation direction as shown in FIG. 3, it is known that the shorter the pitch between the transducers adjacent to each other in the elevation direction, the less likely a so-called grating lobe is generated, and the longer the pitch between the transducers, the more likely the grating lobe is generated. For example, it is known that in a case where D is the pitch between the transducers adjacent to each other in the elevation direction, A is a steering angle of the scanning surface, and L is a wavelength of the ultrasonic wave emitted from the transducer in the patch, a so-called grating lobe can be generated in a direction of an angle B satisfying a condition of $L=D|\sin(A)-\sin(B)|$. For example, in a case where the pitch D is 0.2 mm, the wavelength L is 0.2 mm, and the angle A is 30 degrees, the grating lobe is generated in the direction of the angle B of −30 degrees.

Here, the pitch D between the transducers adjacent to each other in the elevation direction is a distance between centers of a pair of the transducers adjacent to each other in the elevation direction. The steering angle of the scanning surface is an inclination angle of the scanning surface in a YZ plane where an XZ plane is 0 degrees, the steering angle on one surface side of the XZ plane can be positive, and the steering angle on the other surface side of the XZ plane can be negative. The sin(A) is a sine function having the angle A as a phase, the sin(B) is a sine function having the angle B as a phase, and ∥ is an absolute value symbol.

In a case where three-dimensional scanning is performed by performing beam forming on the transmission signal and the reception signal using a patch having a plurality of transducers in each of the azimuth direction and the elevation direction, each patch is effectively treated as one transducer. Therefore, the pitch between the transducers adjacent to each other in the elevation direction is considered as a pitch between the patches adjacent to each other in the elevation direction. In this case, since the pitch D becomes long, the grating lobe is likely to be generated. In a case where the grating lobe is generated, an image called a grating lobe artifact is included in the obtained three-dimensional ultrasound image, which hinders a user from interpreting the three-dimensional ultrasound image.

In addition, regarding a patch having a plurality of transducers in each of the azimuth direction and the elevation direction, the number of patches in the elevation direction is smaller than the number of transducers in the elevation direction included in the two-dimensional transducer array. Therefore, in a case where three-dimensional scanning is performed by performing beam forming using such patches, there is a problem in that an image quality of the obtained three-dimensional ultrasound image is deteriorated as compared with a case where beam forming is performed on the transmission signals and the reception signals of all the transducers in the elevation direction included in the two-dimensional transducer array.

The patch P2 for three-dimensional scanning divided by the patch division circuit 12 as shown in FIG. 3 has one transducer 11A in the elevation direction and has the same number of the transducers 11A in the azimuth direction as the number of the transducers 11A in the azimuth direction of the two-dimensional transducer array 11. Therefore, the number of the patches P2 in the elevation direction is the same as the number of the transducers 11A in the elevation direction included in the two-dimensional transducer array 11. Further, the pitch D between the patches P2 in the elevation direction is the same as the pitch between the transducers 11A adjacent to each other in the elevation direction. The two-dimensional transducer array 11 is composed of a very large number of the transducers 11A, and the pitch D between the patches P2 in the elevation direction is sufficiently short. Therefore, even in a case where all the transducers 11A of the two-dimensional transducer array 11 and the main body beam former 25 cannot be directly connected by a plurality of signal lines, the grating lobe is less likely to be generated.

In addition, in a case where beam forming is performed on the transmission signals and the reception signals of a plurality of the patches P2 by the main body beam former 25, the transmission signals and the reception signals of the respective transducers 11A in the elevation direction of the two-dimensional transducer array 11 are subjected to the beam forming. Therefore, even in a case where all the transducers 11A of the two-dimensional transducer array 11 and the main body beam former 25 cannot be directly connected by a plurality of signal lines, a high-quality three-dimensional ultrasound image can be obtained.

Figure 6:
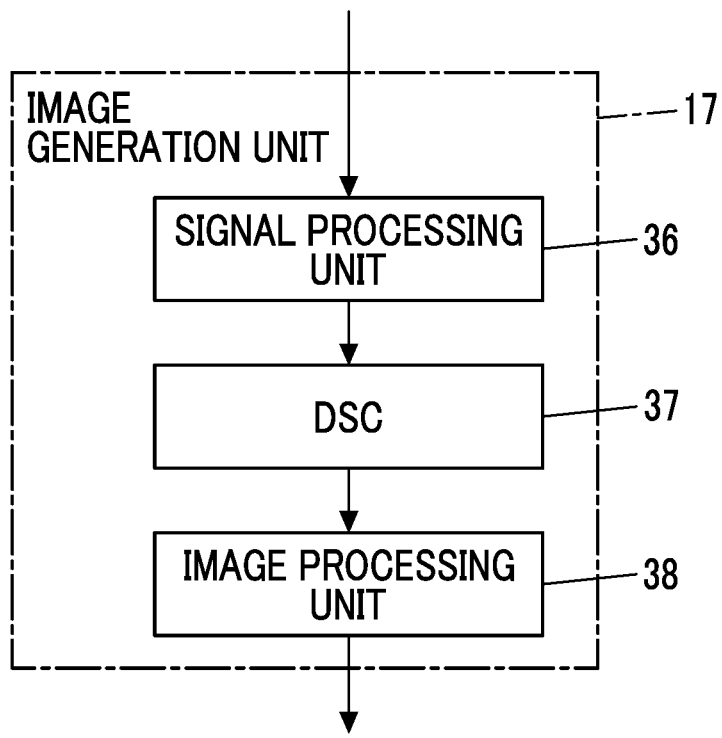
FIG. 6 is a block diagram showing a configuration of an image generation unit in Embodiment 1 of the present invention.

As shown in FIG. 6, the image generation unit 17 has a configuration in which a signal processing unit 36, a digital scan converter (DSC) 37, and an image processing unit 38 are connected in series.

In a case where two-dimensional scanning is performed, the signal processing unit 36 performs attenuation correction by a distance corresponding to a depth of a reflection position of the ultrasonic wave by using a sound velocity value set by the main body control unit 21 on the reception signal received from the reception circuit 16. Thereafter, the signal processing unit 36 performs envelope detection processing to generate a B-mode image signal, which is tomographic image information about a tissue in the subject, as a two-dimensional ultrasound image signal.

In addition, in a case where three-dimensional scanning is performed, the signal processing unit 36 performs the attenuation correction and the envelope detection processing on the reception signal received from the reception circuit 16 in the same manner as in a case of the two-dimensional scanning with respect to a plurality of scanning cross sections. Further, the signal processing unit 36 performs so-called volume rendering processing on the obtained reception signal. Accordingly, the signal processing unit 36 generates a three-dimensional ultrasound image signal.

The DSC 37 converts (raster-converts) the two-dimensional ultrasound image signal and the three-dimensional ultrasound image signal generated by the signal processing unit 36 into an image signal according to a normal television signal scanning method.

The image processing unit 38 performs various kinds of necessary image processing such as gradation processing on the two-dimensional ultrasound image signal and the three-dimensional ultrasound image signal input from the DSC 37, and then transmits the two-dimensional ultrasound image signal and the three-dimensional ultrasound image signal to the display control unit 18. Hereinafter, the two-dimensional ultrasound image signal subjected to image processing by the image processing unit 38 is simply referred to as a two-dimensional ultrasound image, and the three-dimensional ultrasound image signal subjected to image processing by the image processing unit 38 is simply referred to as a three-dimensional ultrasound image.

The scanning control unit 20 controls two-dimensional scanning and three-dimensional scanning performed in the ultrasound diagnostic apparatus 1 by controlling the patch division circuit 12, the plurality of probe beam formers 13, and the main body beam former 25.

Figure 7:
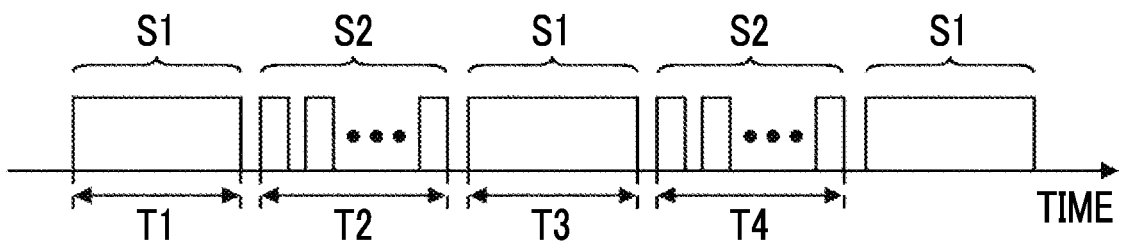
FIG. 7 is a diagram schematically showing temporal timings of two-dimensional scanning and three-dimensional scanning according to Embodiment 1 of the present invention.

The scanning control unit 20 can control scanning such that two-dimensional scanning and three-dimensional scanning are alternately performed. For example, as shown in FIG. 7, the scanning control unit 20 can control scanning such that two-dimensional scanning S1 for obtaining reception signals corresponding to one frame of the two-dimensional ultrasound image and three-dimensional scanning S2 for obtaining reception signals corresponding to one frame of the three-dimensional ultrasound image are alternately performed. In FIG. 7, for example, scanning is controlled such that reception signals corresponding to one frame of the two-dimensional ultrasound image are obtained in a section T1, reception signals corresponding to one frame of the three-dimensional ultrasound image are obtained in a section T2, reception signals corresponding to a new one frame of the two-dimensional ultrasound image are obtained in a section T3, and reception signals corresponding to a new one frame of the three-dimensional ultrasound image are obtained in a section T4.

In such a case, for example, the scanning control unit 20 transmits a signal indicating that the two-dimensional scanning S1 is performed and a signal indicating that the three-dimensional scanning S2 is performed to the patch division circuit 12. The patch division circuit 12 divides the plurality of transducers 11A so as to switch between the patch P1 for the two-dimensional scanning S1 and the patch P2 for the three-dimensional scanning S2 based on the signals transmitted from the scanning control unit 20.

The main body control unit 21 controls each unit of the apparatus main body 3 according to a program recorded in advance or the like.

Under the control of the main body control unit 21, the display control unit 18 performs predetermined processing on the two-dimensional ultrasound image, three-dimensional ultrasound image, and the like generated by the image generation unit 17 and displays them on the monitor 19.

The monitor 19 performs various kinds of display under the control of the display control unit 18. For example, the monitor 19 includes a display device such as a liquid crystal display (LCD) or an organic electroluminescence display (organic EL display).

The input device 22 is used for the user to perform an input operation. For example, the input device 22 is composed of a device such as a keyboard, a mouse, a trackball, a touchpad, and a touch panel for the user to perform the input operation.

The memory 24 is used for temporarily storing a reception signal or the like subjected to beam forming by the main body beam former 25. For example, recording media such as a flash memory, a hard disc drive (HDD), a solid state drive (SSD), a flexible disc (FD), a magneto-optical disc (MO disc), a magnetic tape (MT), a random access memory (RAM), a compact disc (CD), a digital versatile disc (DVD), a secure digital card (SD card), and a universal serial bus memory (USB memory) can be used as the memory 24.

Although the processor 23 having the image generation unit 17, the display control unit 18, the scanning control unit 20, and the main body control unit 21 is configured with a central processing unit (CPU) and a control program causing the CPU to execute various kinds of processing, the processor 23 may be configured using a field programmable gate array (FPGA), a digital signal processor (DSP), an application specific integrated circuit (ASIC), a graphics processing unit (GPU), and other integrated circuits (ICs) or may be configured by a combination thereof.

In addition, the image generation unit 17, the display control unit 18, the scanning control unit 20, and the main body control unit 21 of the processor 23 can also be configured by being partially or wholly integrated into one CPU or the like.

Next, an operation of the ultrasound diagnostic apparatus 1 according to Embodiment 1 of the present invention performing the two-dimensional scanning S1 and the three-dimensional scanning S2 and displaying the two-dimensional ultrasound image and the three-dimensional ultrasound image obtained thereby on the monitor 19 will be described.

First, the user disposes the ultrasound probe 2 on a body surface of the subject and inputs an instruction to start scanning via the input device 22. The information input by the user in this way is transmitted from the main body control unit 21 to each unit of the apparatus main body 3. In this state, the two-dimensional scanning S1 and the three-dimensional scanning S2 are performed under the control of the scanning control unit 20.

An example in which scanning is started by the two-dimensional scanning S1 in the section T1 as shown in FIG. 7 will be described below.

Upon receiving an instruction to start scanning from the main body control unit 21, the scanning control unit 20 transmits information indicating that the two-dimensional scanning S1 is performed in the section T1 to the patch division circuit 12.

The patch division circuit 12 divides the plurality of transducers 11A of the two-dimensional transducer array 11 into a plurality of the patches P1 for the two-dimensional scanning S1 as shown in FIG. 2 based on the information transmitted from the scanning control unit 20.

The transmission circuit 15 of the main body beam former 25 generates a transmission signal based on the instruction to start scanning, which is received from the main body control unit 21, and transmits the generated transmission signal to the plurality of probe beam formers 13 via the transmission/reception switching circuit 14.

In this case, the transmission circuit 15 performs beam forming on the transmission signals of a plurality of the patches P1 for the two-dimensional scanning S1 divided by the patch division circuit 12. The transmission signals subjected to beam forming in the transmission circuit 15 are transmitted to the plurality of probe beam formers 13.

Subsequently, the plurality of probe beam formers 13 perform beam forming on the transmission signals in the respective patches P1 transmitted from the transmission circuit 15 of the main body beam former 25.

In this way, the transmission signals subjected to beam forming in the main body beam former 25 and the plurality of probe beam formers 13 are transmitted to the plurality of transducers 11A of each patch P1.

The plurality of transducers 11A in each patch P1 generate ultrasonic waves based on the received transmission signals. The ultrasonic waves emitted from the plurality of transducers 11A in this way propagate in the subject as ultrasound beams and propagate toward the plurality of transducers 11A as ultrasound echoes by being reflected by the tissue in the subject.

The ultrasound echoes propagating in the subject in this manner are received by the plurality of transducers 11A of a plurality of the patches P1, and the reception signals are generated by the plurality of transducers 11A. The generated reception signals are transmitted to the plurality of probe beam formers 13 via the patch division circuit 12.

The plurality of probe beam formers 13 perform beam forming on the reception signals transmitted from the plurality of transducers 11A of each patch P1. The reception signals subjected to beam forming by the plurality of probe beam formers 13 are transmitted to the main body beam former 25 of the apparatus main body 3.

The reception circuit 16 of the main body beam former 25 performs beamforming on the reception signals of a plurality of the patches P1 subjected to beam forming by the plurality of probe beam formers 13.

In this way, the reception signals subjected to beam forming by the plurality of probe beam formers 13 and the main body beam former 25 are transmitted to the image generation unit 17.

The image generation unit 17 generates a two-dimensional ultrasound image based on the reception signals transmitted from the reception circuit 16 of the main body beam former 25.

The generated two-dimensional ultrasound image is displayed on the monitor 19 after being subjected to predetermined processing in the display control unit 18.

Here, in general, since a two-dimensional transducer array includes a very large number of transducers, it has been difficult to draw signal lines from all the transducers of the two-dimensional transducer array to the apparatus main body. Therefore, in an ultrasound diagnostic apparatus having a two-dimensional transducer array, a plurality of transducers constituting the two-dimensional transducer array are often divided into a plurality of patches having a plurality of transducers in each of the azimuth direction and the elevation direction.

In a case where the two-dimensional scanning S1 is performed by performing beam forming on the reception signals and the transmission signals of such patches, the number of the patches in the azimuth direction is smaller than the number of the transducers in the azimuth direction included in the two-dimensional transducer array. Therefore, there is a problem in that an image quality of the obtained two-dimensional ultrasound image is deteriorated as compared with a case where beam forming is performed on the transmission signals and the reception signals of all the transducers in the azimuth direction included in the two-dimensional transducer array.

As shown in FIG. 2, the patch P1 for the two-dimensional scanning S1 divided by the patch division circuit 12 in Embodiment 1 has one transducer 11A in the azimuth direction and has the same number of the transducers 11A in the elevation direction as the number of the transducers 11A in the elevation direction of the two-dimensional transducer array 11. Therefore, the number of the patches P1 in the azimuth direction is the same as the number of the transducers 11A in the azimuth direction included in the two-dimensional transducer array 11. In a case where beam forming is performed on the transmission signals and the reception signals of a plurality of the patches P1 by the main body beam former 25, the transmission signals and the reception signals of the respective transducers 11A in the azimuth direction of the two-dimensional transducer array 11 are subjected to the beam forming. Therefore, even in a case where all the transducers 11A of the two-dimensional transducer array 11 and the main body beam former 25 cannot be directly connected by a plurality of signal lines, a high-quality two-dimensional ultrasound image can be obtained.

Next, the scanning control unit 20 transmits information indicating that the three-dimensional scanning S2 is performed in the section T2 shown in FIG. 7 to the patch division circuit 12. As an example, it is assumed that reception signals corresponding to one frame of the three-dimensional ultrasound image can be obtained in the section T2.

The patch division circuit 12 divides the plurality of transducers 11A of the two-dimensional transducer array 11 into a plurality of the patches P2 for the three-dimensional scanning S2 as shown in FIG. 3, based on the information transmitted from the scanning control unit 20.

In the same manner as in a case of the two-dimensional scanning S1, the transmission circuit 15 of the main body beam former 25 generates a transmission signal and transmits the generated transmission signal to the plurality of probe beam formers 13 via the transmission/reception switching circuit 14.

In this case, the transmission circuit 15 performs beam forming on the transmission signals of the plurality of patches P2 for the three-dimensional scanning S2 divided by the patch division circuit 12. The transmission signals subjected to beam forming in the main body beam former 25 are transmitted to the plurality of probe beam formers 13.

Subsequently, the plurality of probe beam formers 13 perform beam forming on the transmission signals in each patch P1 transmitted from the main body beam former 25.

In this way, the transmission signals subjected to beam forming in the main body beam former 25 and the plurality of probe beam formers 13 are transmitted to the plurality of transducers 11A of each patch P1.

The plurality of transducers 11A in each patch P2 generate ultrasonic waves based on the received transmission signals. The ultrasonic waves emitted from the plurality of transducers 11A in this way propagate in the subject as ultrasound beams and propagate toward the plurality of transducers 11A as ultrasound echoes by being reflected by the tissue in the subject.

The ultrasound echo propagating in the subject in this way is received by the plurality of transducers 11A of a plurality of the patches P2, and reception signals are generated by the plurality of transducers 11A. The generated reception signals are transmitted to the plurality of probe beam formers 13 via the patch division circuit 12.

The plurality of probe beam formers 13 perform beam forming on the reception signals transmitted from the plurality of transducers 11A of each patch P2. The reception signals subjected to beam forming by the plurality of probe beam formers 13 are transmitted to the main body beam former 25 of the apparatus main body 3.

The reception circuit 16 of the main body beam former 25 performs beamforming on the reception signals of a plurality of the patches P1 subjected to beam forming by the plurality of probe beam formers 13.

In this way, the reception signals subjected to beam forming by the plurality of probe beam formers 13 and the main body beam former 25 are stored in the memory 24.

Here, as shown in FIG. 3, the scanning control unit 20 controls the plurality of probe beam formers 13 and the main body beam former 25 so as to steer the scanning surface in the elevation direction. In other words, the scanning control unit 20 controls the plurality of probe beam formers 13 and the main body beam former 25 to steer the scanning surface obtained by each of a plurality of the patches P2 in the elevation direction such that each scanning surface has any inclination (steering angle) with respect to the vertical direction. In this case, the main body beam former 25 can add delays to the transmission signals and the reception signals of the plurality of patches P2 for the three-dimensional scanning S2 such that the scanning surface is steered in the elevation direction.

In a state where the steering angle is changed in this way, beam forming of the transmission signals by the plurality of probe beam formers 13 and the main body beam former 25, transmission of the ultrasonic waves, reception of the ultrasonic waves, beam forming of the reception signals by the plurality of probe beam formers 13 and the main body beam former 25, and storage of the reception signals in the memory 24 are performed, and further the steering angle is changed.

In this way, in the section T2 shown in FIG. 7, a series of processes from the transmission of the ultrasonic waves to the change of the steering angle are repeated until reception signals corresponding to one frame of the three-dimensional ultrasound image are obtained.

In a case where the reception signals corresponding to one frame of the three-dimensional ultrasound image are stored in the memory 24 by processing in the section T2, the image generation unit 17 reads out the reception signals corresponding to one frame of the three-dimensional ultrasound image from the memory 24 and generates a three-dimensional ultrasound image based on the reception signals. The generated three-dimensional ultrasound image is displayed on the monitor 19 together with the two-dimensional ultrasound image generated in the section T1 after being subjected to predetermined processing by the display control unit 18.

Next, in the section T3, the same processing as the processing of the two-dimensional scanning S1 performed in the section T1 is performed, and a newly generated two-dimensional ultrasound image is displayed on the monitor 19.

After the processing of the two-dimensional scanning S1 in the section T3 is completed, in the next section T4, a series of processes from the transmission of the ultrasonic waves to the change of the steering angle are repeated in order to obtain the reception signals corresponding to a new one frame of the three-dimensional ultrasound image in the same manner as the processing of the three-dimensional scanning S2 performed in the section T2.

In a case where the reception signals corresponding to the new one frame of the three-dimensional ultrasound image are stored in the memory 24 by the processing in the section T4, the image generation unit 17 reads out the reception signals corresponding to one frame of the three-dimensional ultrasound image from the memory 24 and generates a three-dimensional ultrasound image based on the reception signals. The generated three-dimensional ultrasound image is displayed on the monitor 19 together with the two-dimensional ultrasound image generated in the section T3 after being subjected to predetermined processing by the display control unit 18.

Here, generally, in a case where the scanning surface is steered in the elevation direction as shown in FIG. 3, it is known that the shorter the pitch D between the transducers adjacent to each other in the elevation direction, the less likely the grating lobe is generated, and the longer the pitch D between the transducers, the more likely the grating lobe is generated.

In a case where the three-dimensional scanning S2 is performed by performing beam forming on the transmission signal and the reception signal using a patch having a plurality of transducers in each of the azimuth direction and the elevation direction, each patch is effectively treated as one transducer. Therefore, the pitch between the transducers adjacent to each other in the elevation direction is considered as a pitch between the patches adjacent to each other in the elevation direction. In this case, since the pitch D becomes long, the grating lobe is likely to be generated. In a case where the grating lobe is generated, an image called a grating lobe artifact is included in the obtained three-dimensional ultrasound image, which hinders a user from interpreting the three-dimensional ultrasound image.

In addition, regarding a patch having a plurality of transducers in each of the azimuth direction and the elevation direction, the number of patches in the elevation direction is smaller than the number of transducers in the elevation direction included in the two-dimensional transducer array. Therefore, in a case where three-dimensional scanning is performed by performing beam forming using such patches, there is a problem in that an image quality of the obtained three-dimensional ultrasound image is deteriorated as compared with a case where beam forming is performed on the transmission signals and the reception signals of all the transducers in the elevation direction included in the two-dimensional transducer array.

As shown in FIG. 3, the patch P2 for the three-dimensional scanning S2 divided by the patch division circuit 12 in Embodiment 1 has one transducer 11A in the elevation direction and has the same number of the transducers 11A in the azimuth direction as the number of the transducers 11A in the azimuth direction of the two-dimensional transducer array 11. Therefore, the number of the patches P2 in the elevation direction is the same as the number of the transducers 11A in the elevation direction included in the two-dimensional transducer array 11, and the pitch D between the patches P2 in the elevation direction is the same as the pitch between the transducers 11A adjacent to each other in the elevation direction. Since the two-dimensional transducer array 11 is composed of a very large number of the transducers 11A and the pitch D between the patches P2 in the elevation direction is sufficiently short, the grating lobe is less likely to be generated even in a case where all the transducers 11A of the two-dimensional transducer array 11 and the main body beam former 25 cannot be directly connected with a plurality of signal lines.

In addition, in a case where beam forming is performed on the transmission signals and the reception signals of a plurality of the patches P2 by the main body beam former 25, the transmission signals and the reception signals of the respective transducers 11A in the elevation direction of the two-dimensional transducer array 11 are subjected to the beam forming, so that a high-quality three-dimensional ultrasound image can be obtained.

In addition, since the two-dimensional ultrasound image and the three-dimensional ultrasound image are displayed together on the monitor 19, the user can examine the subject while accurately grasping a state of the inside of the subject, such as a part to be observed, by checking the two-dimensional ultrasound image and the three-dimensional ultrasound image together on the monitor 19.

In a case where the three-dimensional ultrasound image is displayed on the monitor 19 together with the two-dimensional ultrasound image in this way, the two-dimensional scanning S1 and the three-dimensional scanning S2 are alternately performed in the next and subsequent sections.

The operation of the ultrasound diagnostic apparatus 1 described in Embodiment 1 is as described above.

From the above, according to the ultrasound diagnostic apparatus 1 of Embodiment 1 of the present invention, the plurality of transducers 11A constituting the two-dimensional transducer array 11 are divided into the patch P1 for the two-dimensional scanning S1 and the patch P2 for the three-dimensional scanning S2 by the patch division circuit 12. Further, beam forming is performed on the transmission signals and the reception signals of the transducers 11A of each of the patches P1 and P2 by the plurality of probe beam formers 13. Further, since beam forming is performed on the transmission signals and the reception signals of a plurality of the patches P1 and P2 by the main body beam former 25, both the image quality of the two-dimensional ultrasound image and the image quality of the three-dimensional ultrasound image can be improved even in a case where all the transducers 11A of the two-dimensional transducer array 11 and the main body beam former 25 cannot be directly connected by a plurality of signal lines.

In addition, the patch P1 for the two-dimensional scanning S1 shown in FIG. 2 has one transducer 11A in the azimuth direction and has the same number of the transducers 11A in the elevation direction as the number of the transducers in the elevation direction of the two-dimensional transducer array 11, but only needs to have two or more transducers 11A in the elevation direction. Even in this case, since the number of the patches P1 in the azimuth direction is the same as the number of the transducers 11A in the azimuth direction of the two-dimensional transducer array 11, the two-dimensional scanning S1 is performed using the patch P1 for the two-dimensional scanning S1 so that a high-quality two-dimensional ultrasound image can be obtained.

In addition, the patch P2 for the three-dimensional scanning S2 shown in FIG. 3 has one transducer 11A in the elevation direction and has the same number of the transducers 11A in the azimuth direction as the number of the transducers in the azimuth direction of the two-dimensional transducer array 11, but only needs to have two or more transducers 11A in the azimuth direction. Even in this case, since the number of the patches P2 in the elevation direction is the same as the number of the transducers 11A in the elevation direction of the two-dimensional transducer array 11, the three-dimensional scanning S2 is performed using the patch P2 for the three-dimensional scanning S2 so that a high-quality three-dimensional ultrasound image in which the grating lobe artifact is suppressed can be obtained.

In addition, in a case where the three-dimensional scanning S2 is performed, the main body beam former 25 can perform beam forming on the transmission signals and the reception signals for a plurality of the patches P1 and P2 such that a range of the steering angles of the ultrasonic waves is symmetric in the elevation direction. Accordingly, it is possible to obtain a three-dimensional ultrasound image depicting the inside of the subject over a wide range.

In addition, in a case where the three-dimensional scanning S2 is performed, the main body beam former 25 can also perform beam forming on the transmission signals and the reception signals for a plurality of the patches P1 and P2 such that a range of the steering angles of the ultrasonic waves is asymmetric in the elevation direction. Accordingly, for example, since scanning in a range that does not need to be observed by the user can be omitted, a calculation load required for generating the three-dimensional ultrasound image can be reduced, and a frame rate of the three-dimensional ultrasound image displayed on the monitor 19 can be improved.

In addition, in a case where the three-dimensional scanning S2 is performed, the main body beam former 25 can also perform beam forming on the transmission signals and the reception signals for a plurality of the patches P1 and P2 such that an interval between the steering angles of the ultrasonic waves is changed according to absolute values of the steering angles. Here, the interval between the steering angles refers to an angle formed by a pair of scanning surfaces adjacent to each other. More specifically, the interval between the steering angles is an angle formed by the scanning surfaces of two adjacent patches P2 and P2. In this case, for example, the main body beam former 25 can perform scanning such that the closer the steering angle is to 0 degrees, the closer an angular interval between adjacent scanning surfaces is, while the farther the steering angle is from 0 degrees, the more sparse the angular interval between the adjacent scanning surfaces is. That is, an inclination of the scanning surface with respect to the vertical direction increases as it approaches the vicinity of an end portion of a steering range, and scanning can be performed such that the angular interval with the adjacent scanning surface is sparse. Also in this case, since scanning in a range that does not need to be observed by the user can be omitted, a calculation load required for generating the three-dimensional ultrasound image can be reduced, and a frame rate of the three-dimensional ultrasound image displayed on the monitor 19 can be improved.

Further, in the description of the operation of the ultrasound diagnostic apparatus 1, although the two-dimensional scanning S1 is started and then the three-dimensional scanning S2 is performed, the operation may be started from the three-dimensional scanning S2.

In addition, in the description using FIG. 7, an example is described in which reception signals corresponding to one frame of the three-dimensional ultrasound image are obtained in each of the three-dimensional scanning S2 in the section T2 and the three-dimensional scanning S2 in the section S4. On the other hand, for example, reception signals corresponding to a half of one frame of the three-dimensional ultrasound image may be obtained by the three-dimensional scanning S2 in the section T2, and reception signals corresponding to a remaining half of the one frame of the three-dimensional ultrasound image may be obtained by the three-dimensional scanning S2 in the section T4. In general, a sufficiently long time is required for the three-dimensional scanning S2 for obtaining the reception signals corresponding to one frame of the three-dimensional ultrasound image and the generation of the three-dimensional ultrasound image. Therefore, by performing the two-dimensional scanning S1 in the middle of the three-dimensional scanning S2, it is possible to maintain a high frame rate of the two-dimensional ultrasound image displayed on the monitor 19.

Further, the reception signals obtained in the sections T2 and T4 of the three-dimensional scanning S2 are not limited to the reception signals corresponding to one frame of the three-dimensional ultrasound image and the reception signals corresponding to a half of the one frame of the three-dimensional ultrasound image. For example, reception signals of ⅓ of one frame of the three-dimensional ultrasound image may be obtained, reception signals of ¼ of the one frame of the three-dimensional ultrasound image may be obtained, or reception signals of a smaller ratio may be obtained. Even in this case, it is possible to maintain a high frame rate of the two-dimensional ultrasound image displayed on the monitor 19.

Further, it is described that in a case in which reception signals corresponding to a half of one frame of the three-dimensional ultrasound image are obtained in the section T2, the reception signals corresponding to the one frame of the three-dimensional ultrasound image are stored in the memory 24 and then the generation of the three-dimensional ultrasound image is performed. On the other hand, for example, in a case where reception signals are obtained in the section T2, the reception signals may be used to generate a three-dimensional ultrasound image having half the information amount of one frame of the three-dimensional ultrasound image and display the generated three-dimensional ultrasound image on the monitor 19, and in a case where reception signals are obtained in the section T4, the reception signals obtained in the section T2 and the section T4 may be used to generate one frame of a three-dimensional ultrasound image and display the generated three-dimensional ultrasound image on the monitor 19. In this way, a three-dimensional ultrasound image can be generated each time the reception signals are obtained in one section of the three-dimensional scanning S2, and the generated three-dimensional ultrasound image can be displayed on the monitor 19 together with the two-dimensional ultrasound image. Accordingly, in addition to being able to maintain a high frame rate of the two-dimensional ultrasound image displayed on the monitor 19, it is also possible to improve a frame rate of the three-dimensional ultrasound image displayed on the monitor 19.

Figure 8:
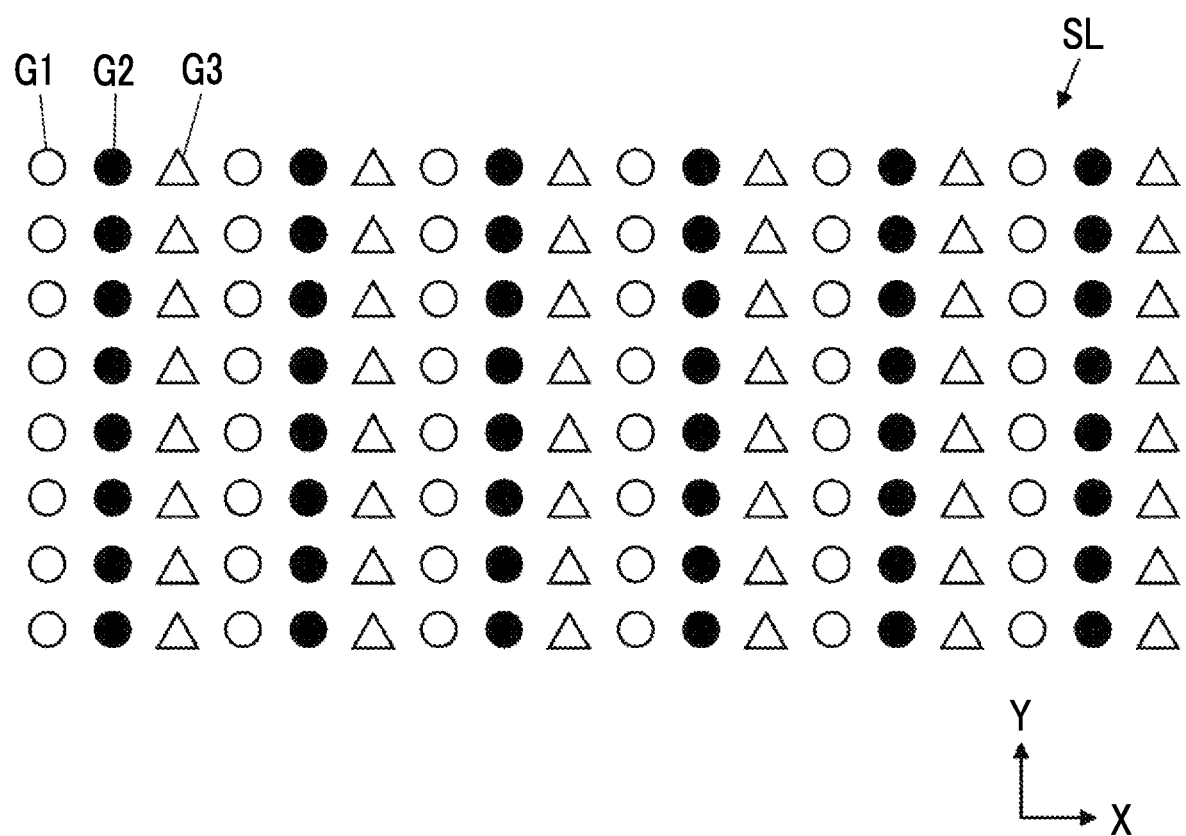
FIG. 8 is a diagram schematically showing grouped scanning lines in Embodiment 1 of the present invention.

In addition, as is schematically shown in FIG. 8, in a case where the three-dimensional scanning S2 is performed, the scanning control unit 20 may divide a plurality of scanning lines SL in the three-dimensional scanning S2 into a plurality of groups G1, G2, and G3 such that scanning lines SL adjacent to each other in the azimuth direction in the three-dimensional scanning S2 belong to the groups G1, G2, and G3 different from each other. The scanning control unit 20 can control the plurality of probe beam formers 13 such that scanning is performed for each of the divided groups G1, G2, and G3 and can switch the three-dimensional scanning S2 to the two-dimensional scanning S1 each time the three-dimensional scanning S2 of at least one of the divided groups G1, G2, or G3 ends.

In the example shown in FIG. 8, a plurality of the scanning lines SL in the three-dimensional scanning S2 are divided into three groups G1, G2, and G3 such that the scanning lines SL adjacent to each other in the azimuth direction belong to different groups among the three groups G1, G2, and G3. In this case, for example, the three-dimensional scanning S2 is performed along a plurality of the scanning lines SL belonging to the group G1 in the section T2 of FIG. 7, the three-dimensional scanning S2 is performed along a plurality of the scanning lines SL belonging to the group G2 in the section T4, and the three-dimensional scanning S2 is performed along a plurality of the scanning lines SL belonging to the group G3 in a next section of the three-dimensional scanning S2. In other words, the groups G1, G2, and G3 of the scanning lines SL to be used are switched each time the three-dimensional scanning S2 is performed.

In this case, the three-dimensional ultrasound image may be generated in a case where all the reception signals corresponding to the three groups G1, G2, and G3 are obtained, and the three-dimensional ultrasound image may be generated in a case where the reception signals corresponding to each of the three groups G1, G2, and G3 are obtained. In a case where the three-dimensional ultrasound image is generated in a case where the reception signals corresponding to each of the groups G1, G2, and G3 are obtained, first, a three-dimensional ultrasound image having a density of ⅓ of that of one frame of the three-dimensional ultrasound image is generated from the reception signals corresponding to the group G1 in a case where the reception signals corresponding to the group G1 are obtained. Next, in a case where the reception signals corresponding to the group G2 are obtained, a three-dimensional ultrasound image having a density of ⅔ of that of one frame of the three-dimensional ultrasound image is generated from the reception signals corresponding to the group G1 and the reception signals corresponding to the group G2. Finally, in a case where the reception signals corresponding to the group G3 are obtained, one frame of the three-dimensional ultrasound image is generated from the reception signals corresponding to the three groups G1, G2, and G3.

Further, although not shown, a sensor that detects a movement of the ultrasound probe 2 such as an acceleration sensor or a gyro sensor can also be attached to the ultrasound probe 2. In this case, it is possible to detect that the ultrasound probe 2 moves together with the body surface of the subject due to, for example, respiration of the subject. Further, in a case where the detected movement of the subject is larger than a predetermined movement threshold value, the three-dimensional ultrasound image can be generated using only the reception signals corresponding to the latest one group. Accordingly, it is possible to generate a three-dimensional ultrasound image that follows the movement of the subject.

In addition, in a case where the two-dimensional scanning S1 is performed, the scanning control unit 20 may divide a plurality of the scanning lines SL in the two-dimensional scanning S1 into a plurality of groups such that the scanning lines SL adjacent to each other in the elevation direction in the two-dimensional scanning S1 belong to different groups. Therefore, the scanning control unit 20 can control the plurality of probe beam formers 13 such that scanning is performed for each of the divided groups and can switch the two-dimensional scanning S1 to the three-dimensional scanning S2 each time the two-dimensional scanning S1 of at least one of the divided groups ends.

Although not shown, for example, in a case where a plurality of the scanning lines SL in the two-dimensional scanning S1 are divided into three groups, the reception signals corresponding to a first group are obtained in the section T1 of FIG. 7, the reception signals corresponding to a second group are obtained in the section T3, and the reception signals corresponding to a third group are obtained in the next section of the two-dimensional scanning S1. In this case, the two-dimensional ultrasound image may be generated in a case where all the reception signals corresponding to the three groups are obtained, and the two-dimensional ultrasound image may be generated in a case where the reception signals corresponding to each of the groups are obtained.

In addition, the two-dimensional transducer array 11 can have a width in the azimuth direction which is at least 2.5 times a width in the elevation direction, that is, a size of the two-dimensional transducer array 11 can be designed such that the width in the azimuth direction is at least 2.5 times the width in the elevation direction. Since the width in the elevation direction of the two-dimensional transducer array 11 is shorter than the width in the azimuth direction, in a case where a tip part of the ultrasound probe 2 is brought into contact with the body surface of the subject, a gap is less likely to be generated between the ultrasound probe 2 and the body surface of the subject, and the ultrasound probe 2 can be brought into contact with the curved body surface without any gap. Further, in the ultrasound diagnostic apparatus 1 of Embodiment 1, in a case where the three-dimensional scanning S2 is performed, the patch P2 including one transducer 11A in the elevation direction and a plurality of the transducers 11A in the azimuth direction is used. Therefore, even in a case where a width of the two-dimensional transducer array 11 in the elevation direction is shorter than a width of the two-dimensional transducer array 11 in the azimuth direction, a high-quality three-dimensional ultrasound image in which the grating lobe artifact is suppressed can be obtained.

Embodiment 2

In Embodiment 1, all the transducers 11A constituting the two-dimensional transducer array 11 are divided into a plurality of the patches P1 for the two-dimensional scanning S1 and a plurality of the patches P2 for the three-dimensional scanning. However, an opening that moves (sweeps) in the azimuth direction can be set in the two-dimensional transducer array 11, and a plurality of the transducers 11A in the opening can be divided into a plurality of the patches P1 and P2. Here, the opening means a region for selecting any plurality of transducers 11A from a plurality of the transducers 11A arranged in each of the elevation direction and the azimuth direction.

Figure 9:
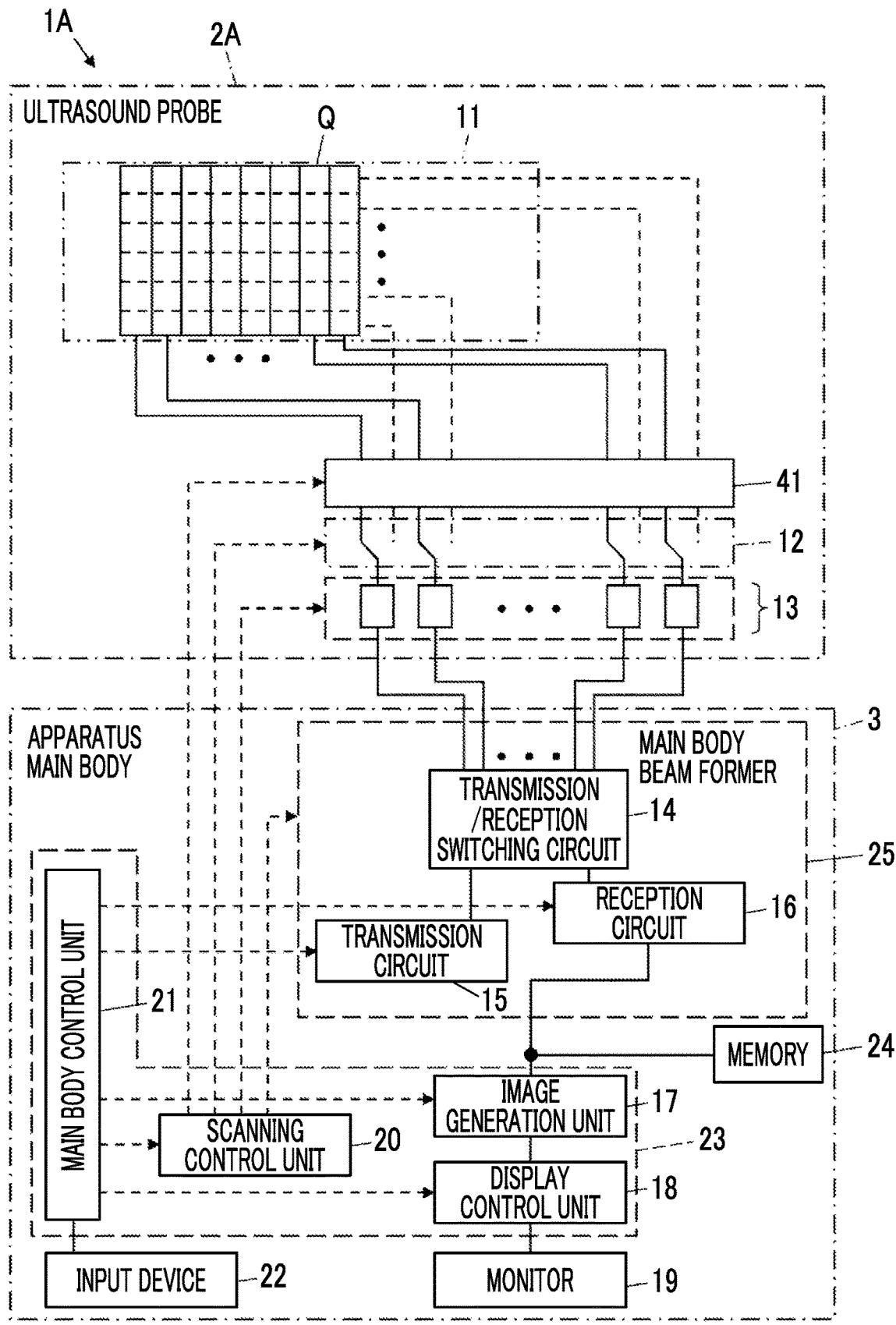
FIG. 9 is a block diagram showing a configuration of an ultrasound diagnostic apparatus according to Embodiment 2 of the present invention.

FIG. 9 shows a configuration of an ultrasound diagnostic apparatus 1A according to Embodiment 2 of the present invention. The ultrasound diagnostic apparatus 1A of Embodiment 2 comprises an ultrasound probe 2A instead of the ultrasound probe 2 in the ultrasound diagnostic apparatus 1 of Embodiment 1 shown in FIG. 1.

The ultrasound probe 2A in Embodiment 2 is configured by adding a sweep circuit 41 in the ultrasound probe 2 in Embodiment 1. In the ultrasound probe 2A, the sweep circuit 41 is connected to the two-dimensional transducer array 11, and the patch division circuit 12 is connected to the sweep circuit 41.

Under the control of the scanning control unit 20, the sweep circuit 41 selects a plurality of the transducers 11A included in the opening in which the transducers 11A having a first transducer number, which is equal to or smaller than the number of the transducers in the elevation direction of the two-dimensional transducer array 11, are arranged in the elevation direction, and the transducers 11A having a second transducer number, which is smaller than the number of the transducers in the azimuth direction of the two-dimensional transducer array 11, are arranged in the azimuth direction, as at least a part of the transducers 11A of the two-dimensional transducer array 11, that is, as a sub-array.

Figure 10:
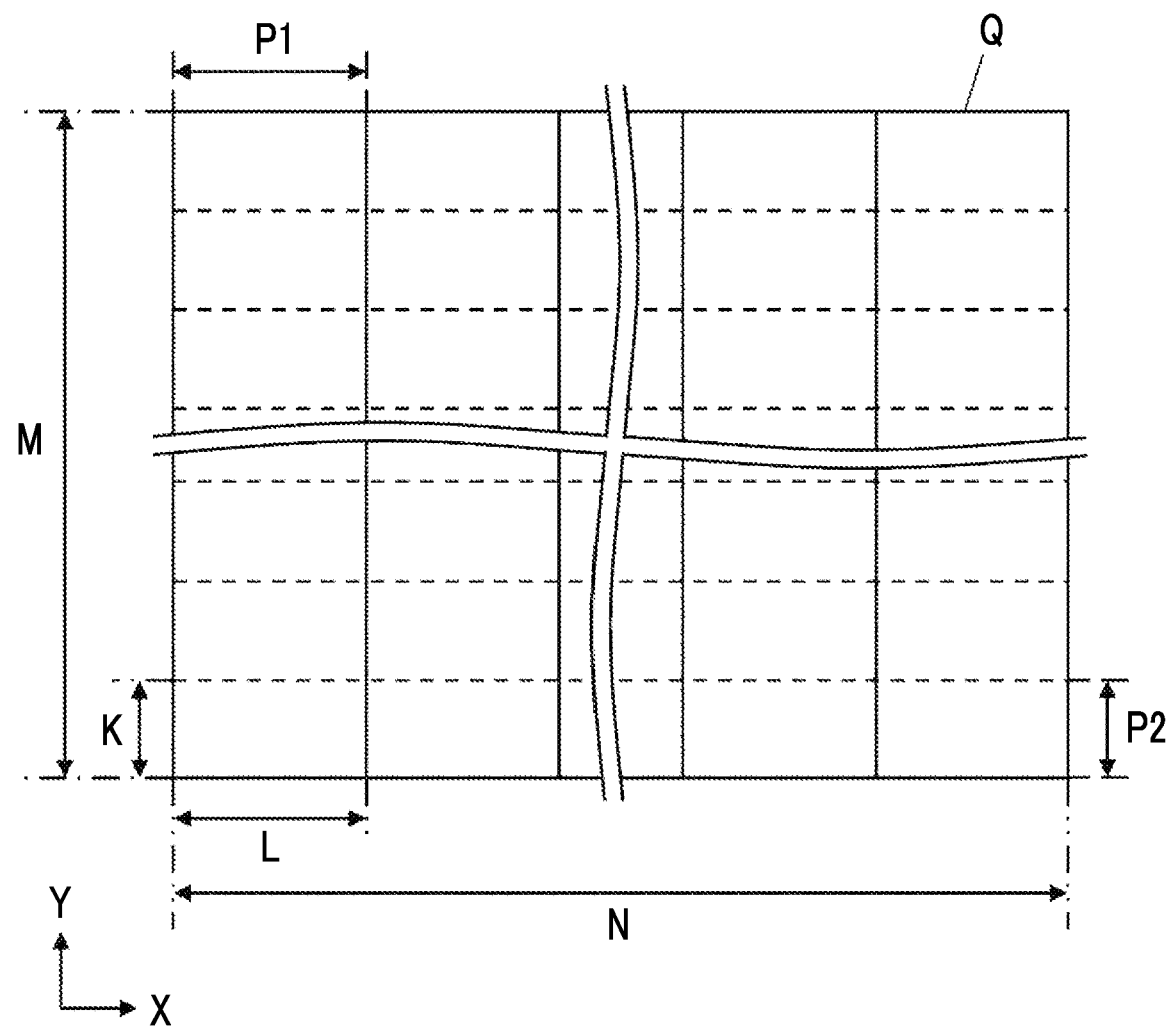
FIG. 10 is a diagram schematically showing an opening in Embodiment 2 of the present invention.

In a case where the first transducer number is M and the second transducer number is N, the sweep circuit 41 directly selects, for example, from a plurality of the transducers 11A of the two-dimensional transducer array 11, M×N transducers 11A included in the opening Q in which M transducers 11A are arranged in the elevation direction and N transducers 11A are arranged in the azimuth direction, as shown in FIG. 10. Here, M and N are integers greater than or equal to two. In FIG. 9, M is equal to the number of the transducers in the elevation direction of the two-dimensional transducer array 11, and N is smaller than the number of the transducers in the azimuth direction of the two-dimensional transducer array 11.

In addition, the sweep circuit 41 sweeps the opening Q in the azimuth direction in a case where the two-dimensional scanning S1 and the three-dimensional scanning S2 are performed.

The patch division circuit 12 divides a plurality of the patches P1 and P2 in the opening Q. In a case where the two-dimensional scanning S1 is performed, the patch division circuit 12 divides a plurality of the transducers 11A in the opening Q into a plurality of the patches P1 for the two-dimensional scanning S1 in which K (submultiple of M) transducers 11A are arranged in the elevation direction, respectively. In addition, in a case where the three-dimensional scanning S2 is performed, the patch division circuit 12 divides a plurality of the transducers 11A in the opening Q into a plurality of the patches P2 for the three-dimensional scanning S2 in which L (submultiple of N) transducers 11A are arranged in the azimuth direction, respectively.

As described above, even in a case where the opening Q is set in the two-dimensional transducer array 11, a plurality of the transducers 11A in the opening Q are divided into the patches P1 for the two-dimensional scanning S1 and the patches P2 for the three-dimensional scanning S2, respectively, by the patch division circuit 12. Therefore, the control of the opening Q can be shared between the two-dimensional scanning S1 and the three-dimensional scanning S2, a scale of a circuit mounted in the ultrasound probe 2A can be reduced, and the control of scanning can be simplified.

Embodiment 3

In Embodiment 2, the sweep circuit 41 directly selects the transducers 11A included in the opening Q, as a plurality of the transducers 11A, which are at least a part of the two-dimensional transducer array 11, that is, as a sub-array, by being connected to the two-dimensional transducer array 11. On the other hand, the sweep circuit 41 can indirectly select the transducers 11A included in the opening Q as a sub-array by being connected to the plurality of probe beam formers 13.

Figure 11:
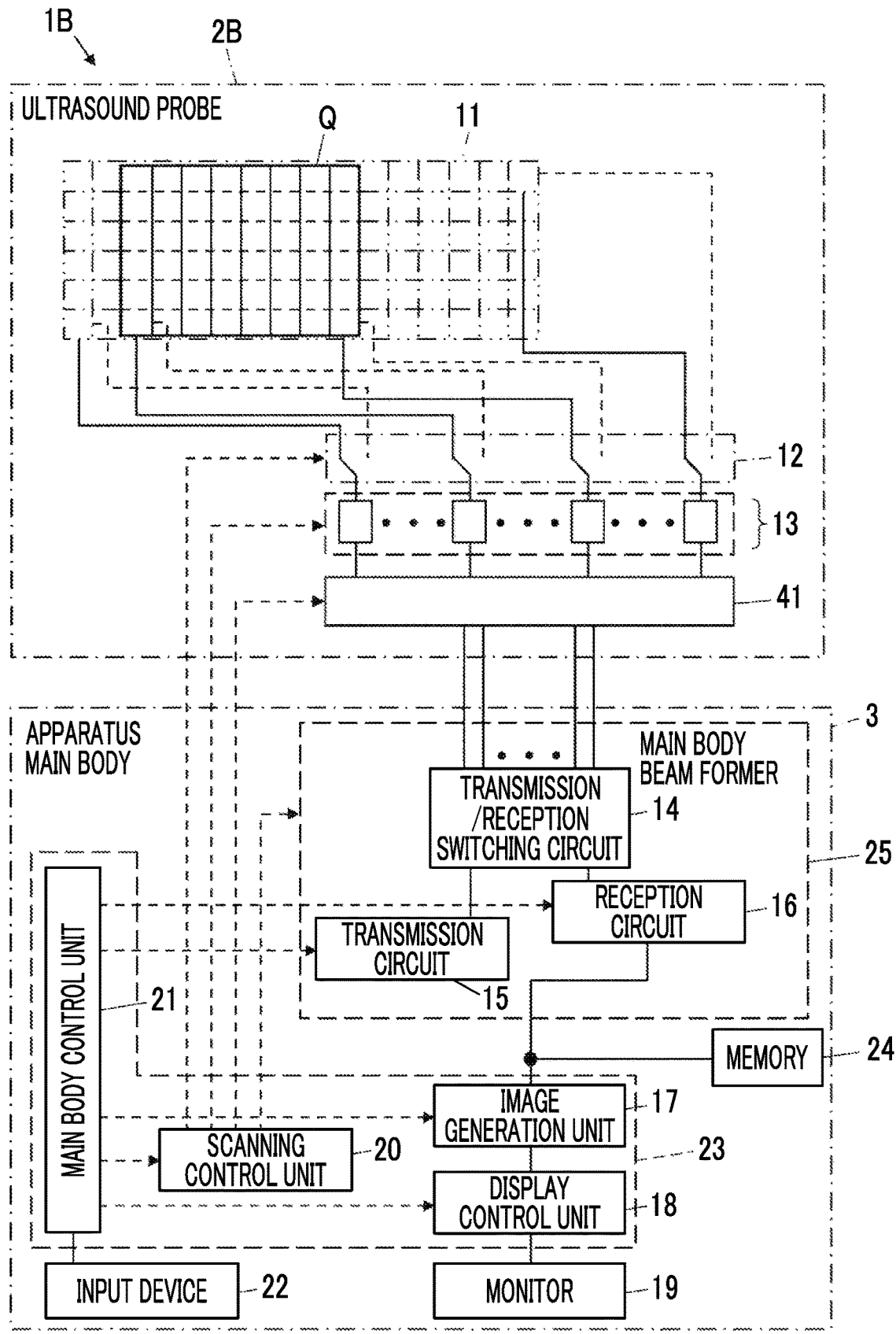
FIG. 11 is a block diagram showing a configuration of an ultrasound diagnostic apparatus according to Embodiment 3 of the present invention.

FIG. 11 shows a configuration of an ultrasound diagnostic apparatus 1B of Embodiment 3. The ultrasound diagnostic apparatus 1B of Embodiment 3 comprises an ultrasound probe 2B instead of the ultrasound probe 2A in the ultrasound diagnostic apparatus 1A of Embodiment 2 shown in FIG. 9.

In the ultrasound probe 2B according to Embodiment 3, a connection position of the sweep circuit 41 is changed in the ultrasound probe 2A according to Embodiment 2. The ultrasound probe 2B has a plurality of probe beam formers 13 corresponding to all the transducers 11A constituting the two-dimensional transducer array 11. The patch division circuit 12 and the plurality of probe beam formers 13 are sequentially connected to the two-dimensional transducer array 11, and the sweep circuit 41 is connected to the plurality of probe beam formers 13. Further, the main body beam former 25 of the apparatus main body 3 is connected to the sweep circuit 41.

In Embodiment 3, the sweep circuit 41 selects a part of the probe beam formers 13 corresponding to a plurality of the patches P1 and P2 divided by the patch division circuit 12 from among the plurality of probe beam formers 13 to thereby select a plurality of the transducers 11A corresponding to the selected probe beam formers 13 as M×N transducers 11A in the opening Q.

As described above, even in a case where M×N transducers 11A in the opening Q are indirectly selected by the sweep circuit 41, a plurality of the transducers 11A in the opening Q are used by the patch division circuit 12 are divided into the patches P1 for the two-dimensional scanning S1 and the patches P2 for the three-dimensional scanning S2, respectively, in the same manner as in Embodiment 2. Therefore, the control of the opening Q can be shared between the two-dimensional scanning S1 and the three-dimensional scanning S2, the scale of the circuit mounted in the ultrasound probe 2A can be reduced, and the control of scanning can be simplified.

Embodiment 4

In Embodiment 1, the three-dimensional ultrasound image corresponding to the entire scanning range in the three-dimensional scanning S2 is generated. However, it is also possible to detect an observation target of the user and generate a three-dimensional ultrasound image of the detected observation target.

Figure 12:
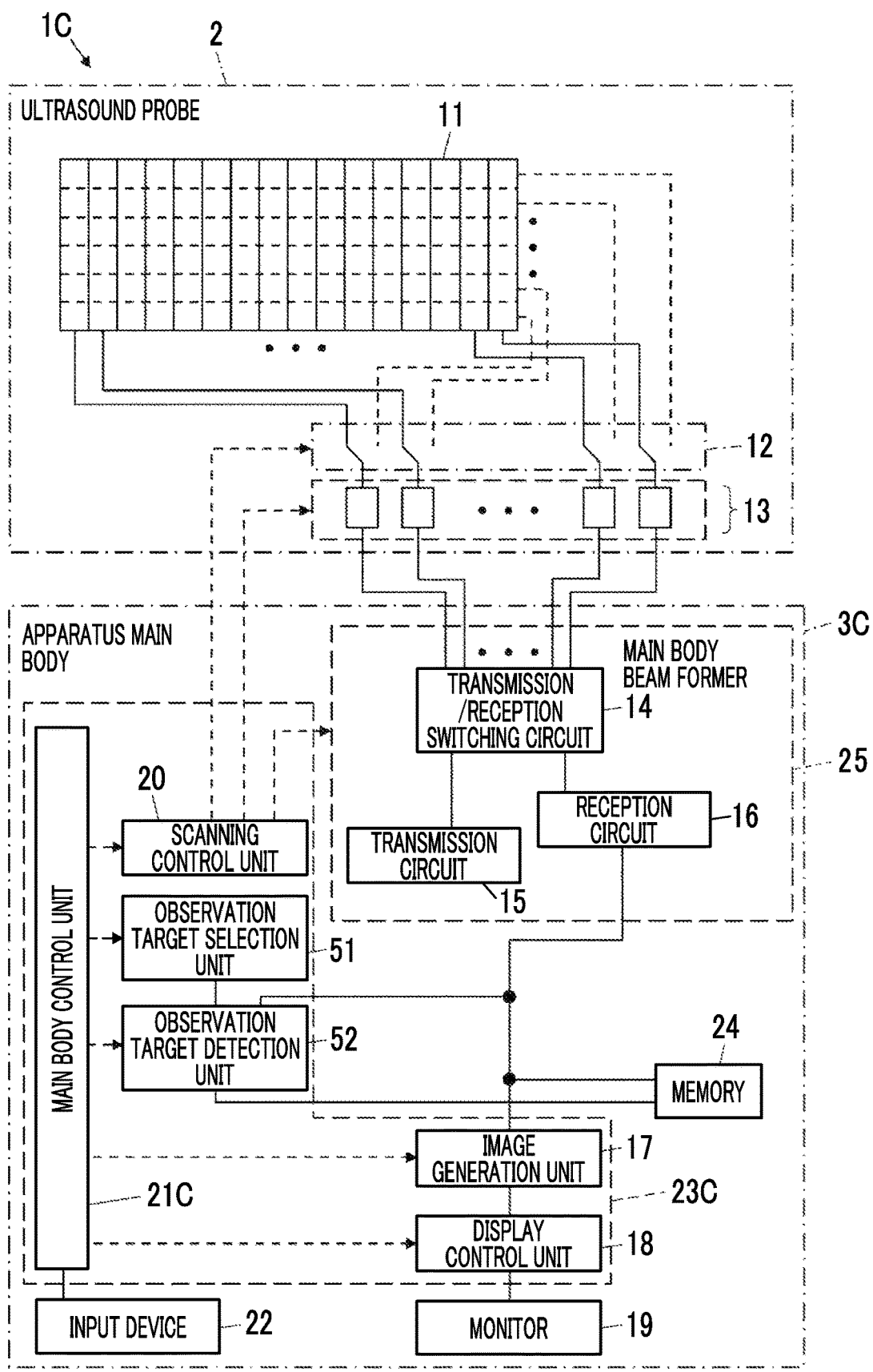
FIG. 12 is a block diagram showing a configuration of an ultrasound diagnostic apparatus according to Embodiment 4 of the present invention.

FIG. 12 shows a configuration of an ultrasound diagnostic apparatus 1C of Embodiment 4. The ultrasound diagnostic apparatus 1C of Embodiment 4 comprises an apparatus main body 3C instead of the apparatus main body 3 in the ultrasound diagnostic apparatus 1 of Embodiment 1 shown in FIG. 1.

In the apparatus main body 3C according to Embodiment 4, an observation target selection unit 51 and an observation target detection unit 52 are added, a main body control unit 21C is provided in place of the main body control unit 21, and a processor 23C is provided in place of the processor 23 in the apparatus main body 3 according to Embodiment 1.

In the apparatus main body 3C, the observation target selection unit 51 is connected to the main body control unit 21C. Further, the observation target detection unit 52 is connected to the reception circuit 16 and the observation target selection unit 51. In addition, the memory 24 is connected to the reception circuit 16 and the observation target detection unit 52. In addition, the image generation unit 17, the display control unit 18, the scanning control unit 20, the main body control unit 21C, the observation target selection unit 51, and the observation target detection unit 52 constitute the processor 23C for the apparatus main body 3C.

The observation target selection unit 51 stores in advance a plurality of parts of the subject, which can be the observation target of the user, a treatment tool, and the like, and selects the observation target based on an input operation of the user via the input device 22. In this case, for example, a list of the plurality of parts to be observed, the treatment tool, and the like that are stored in advance is displayed on the monitor 19, and in a case where the user selects one observation target via the input device 22, the observation target selection unit 51 can select the observation target selected by the user.

The observation target detection unit 52 detects the observation target selected by the observation target selection unit 51 based on the reception signals supplied via the reception circuit 16 of the main body beam former 25 by performing the three-dimensional scanning S2. Information on the observation target detected by the observation target detection unit 52 is stored in the memory 24 in association with the reception signals with which the observation target is detected.

The image generation unit 17 reads out the information on the observation target detected by the observation target detection unit 52 and the reception signals from the memory 24, and performs volume rendering processing on the observation target detected by the observation target detection unit 52 to generate the three-dimensional ultrasound image of the observation target.

The three-dimensional ultrasound image of the observation target generated by the image generation unit 17 in this way can be, for example, superimposed on the two-dimensional ultrasound image, and displayed on the monitor 19. In addition, the three-dimensional ultrasound image of the observation target may be displayed on the monitor 19 side by side with the two-dimensional ultrasound image.

As described above, according to the ultrasound diagnostic apparatus 1C of Embodiment 4, the observation target is detected, and volume rendering is performed on the detected observation target to generate the three-dimensional ultrasound image of the observation target. Therefore, the user can understand in detail a shape and a three-dimensional positional relationship of the observation target, and the like.

The image generation unit 17 can also generate the three-dimensional ultrasound image by reducing the reception signals of a portion other than a portion corresponding to the observation target detected by the observation target detection unit 52. Also in this case, since the three-dimensional ultrasound image in which the observation target is emphasized can be obtained, the user can understand in detail the shape and the three-dimensional positional relationship of the observation target, and the like. In addition, as compared with a case of generating the three-dimensional ultrasound image corresponding to the entire scanning range as in Embodiment 1, a calculation load required for generating the three-dimensional ultrasound image can be reduced, and a frame rate for displaying the three-dimensional ultrasound image can be improved.

Although it has been described that the aspect of Embodiment 4 can be applied to Embodiment 1, the aspect can also be applied to Embodiments 2 and 3.

EXPLANATION OF REFERENCES 1, 1A, 1B, 1C: ultrasound diagnostic apparatus
2, 2A, 2B: ultrasound probe
3, 3C: apparatus main body
11: two-dimensional transducer array
11A: transducer
12: patch division circuit
13: probe beam former
14: transmission/reception switching circuit
15: transmission circuit
16: reception circuit
17: image generation unit
18: display control unit
19: monitor
20: scanning control unit
21, 21C: main body control unit
22: input device
23, 23C: processor
24: memory
25: main body beam former
31: transmission signal generation circuit
32: delay signal generation circuit
33: amplification circuit
34: AD conversion circuit
35: delay-and-sum circuit
36: signal processing unit
37: DSC
38: image processing unit
41: sweep circuit
51: observation target selection unit
52: observation target detection unit
G1, G2, G3: group
P1, P2: patch
Q: opening
S1: two-dimensional scanning
S2: three-dimensional scanning
SL: scanning line
T1, T2, T3, T4: section

What is claimed is:

1. An ultrasound diagnostic apparatus that performs both two-dimensional scanning and three-dimensional scanning, comprising:
an ultrasound probe;
an apparatus main body connected to the ultrasound probe; and
a monitor,
wherein the ultrasound probe includes
a two-dimensional transducer array in which a plurality of transducers are arranged in each of an elevation direction and an azimuth direction,
a patch division circuit configured to divide a plurality of transducers, which are at least a part of the two-dimensional transducer array, into a plurality of patches in which one transducer is arranged in the azimuth direction and two or more transducers are arranged in the elevation direction, respectively, for performing the two-dimensional scanning, and divide a plurality of transducers, which are at least a part of the two-dimensional transducer array, into a plurality of patches in which one transducer is arranged in the elevation direction and two or more transducers are arranged in the azimuth direction, respectively, for performing the three-dimensional scanning, and a plurality of probe beam former circuits corresponding to the plurality of patches divided by the patch division circuit, wherein the apparatus main body includes a main body beam former circuit connected to the plurality of probe beam former circuits of the ultrasound probe, and a processor, wherein the plurality of probe beam former circuits are configured to perform beam forming on transmission signals and reception signals for the two or more transducers in the plurality of patches, the main body beam former circuit is configured to perform beam forming on the transmission signals and the reception signals for the plurality of patches, and the processor is configured to generate a two-dimensional ultrasound image based on the two-dimensional scanning, generate a three-dimensional ultrasound image based on the three-dimensional scanning, superimpose the three-dimensional ultrasound image on the two-dimensional ultrasound image, and display the two-dimensional ultrasound image and the three-dimensional ultrasound image on the monitor.

2. The ultrasound diagnostic apparatus according to claim 1, wherein the main body beam former circuit includes a transmission circuit and a reception circuit each connected to the plurality of probe beam former circuits, the processor is connected to the reception circuit, ultrasound beams are transmitted from the plurality of transducers which are at least a part of the two-dimensional transducer array by supplying the transmission signals from the transmission circuit to the two or more transducers in the plurality of patches via the plurality of probe beam former circuits, and ultrasound echoes are received by the plurality of transducers which are at least a part of the two-dimensional transducer array by supplying the reception signals from the two or more transducers in the plurality of patches to the processor via the plurality of probe beam former circuits and the reception circuit.

3. The ultrasound diagnostic apparatus according to claim 2, wherein the processor is configured to generate a two-dimensional ultrasound image based on the reception signals supplied via the reception circuit of the main body beam former circuit by performing the two-dimensional scanning, and generates a three-dimensional ultrasound image based on the reception signals supplied via the reception circuit of the main body beam former circuit by performing the three-dimensional scanning.

4. The ultrasound diagnostic apparatus according to claim 1, further comprising:

a sweep circuit configured to select, as the plurality of transducers which are at least a part of the two-dimensional transducer array, a plurality of transducers included in an opening in which the transducers having a first transducer number, which is equal to or smaller than the number of the transducers in the elevation direction of the two-dimensional transducer array, are arranged in the elevation direction, and the transducers having a second transducer number, which is smaller than the number of the transducers in the azimuth direction of the two-dimensional transducer array, are arranged in the azimuth direction, wherein the patch division circuit performs division of the plurality of patches in the opening, and the two-dimensional scanning and the three-dimensional scanning are performed using the transducers in the opening while sweeping the opening in the azimuth direction by the sweep circuit.

5. The ultrasound diagnostic apparatus according to claim 4, wherein in a case where the first transducer number is M and the second transducer number is N, the patch division circuit is configured to divide a plurality of transducers included in the opening into a plurality of the patches in which K (submultiple of M) transducers are arranged in the elevation direction, respectively, for performing the two-dimensional scanning, and divide a plurality of transducers included in the opening into a plurality of the patches in which L (submultiple of N) transducers are arranged in the azimuth direction, respectively, for performing the three-dimensional scanning.

6. The ultrasound diagnostic apparatus according to claim 4, wherein the plurality of probe beam former circuits are connected to the patch division circuit, the patch division circuit is connected to the sweep circuit, and the sweep circuit is connected to the plurality of transducers of the two-dimensional transducer array and is configured to directly select a plurality of transducers included in the opening from the plurality of transducers.

7. The ultrasound diagnostic apparatus according to claim 4, wherein the sweep circuit is connected to the plurality of probe beam former circuits, the plurality of probe beam former circuits are connected to the patch division circuit, the patch division circuit is connected to the plurality of transducers of the two-dimensional transducer array, and the sweep circuit is configured to select a plurality of transducers included in the opening by selecting a part of the probe beam former circuits from the plurality of probe beam former circuits.

8. The ultrasound diagnostic apparatus according to claim 1, wherein the main body beam former circuit is configured to perform beam forming for delaying the transmission signals and the reception signals for the plurality of patches such that ultrasonic waves transmitted and received from the two-dimensional transducer array are steered in the elevation direction for performing the three-dimensional scanning.

9. The ultrasound diagnostic apparatus according to claim 8, wherein the main body beam former circuit is configured to perform beam forming on the transmission signals and the reception signals for the plurality of patches such that a range of steering angles of the ultrasonic waves is asymmetric in the elevation direction for performing the three-dimensional scanning.

10. The ultrasound diagnostic apparatus according to claim 8,
wherein the main body beam former circuit is configured to perform beam forming on the transmission signals and the reception signals for the plurality of patches such that an interval between steering angles of the ultrasonic waves is changed according to absolute values of the steering angles for performing the three-dimensional scanning.

11. The ultrasound diagnostic apparatus according to claim 1,
wherein the apparatus main body includes a processor configured to control scanning such that the two-dimensional scanning and the three-dimensional scanning are alternately performed.

12. The ultrasound diagnostic apparatus according to claim 11,
wherein the processor is configured to divide a plurality of scanning lines in the three-dimensional scanning into a plurality of groups such that scanning lines adjacent to each other in the azimuth direction in the three-dimensional scanning belong to different groups for performing the three-dimensional scanning, control the plurality of probe beam former circuits such that scanning is performed for each of the divided groups, and switch the three-dimensional scanning to the two-dimensional scanning each time the three-dimensional scanning of at least one of the divided groups ends.

13. The ultrasound diagnostic apparatus according to claim 1,
wherein the two-dimensional transducer array has a width in the azimuth direction which is at least 2.5 times a width in the elevation direction.

14. The ultrasound diagnostic apparatus according to claim 3,
wherein the processor is configured to
select an observation target based on an input operation of a user, and
detect the observation target which is selected based on the reception signals supplied via the main body beam former circuit by performing the three-dimensional scanning.

15. The ultrasound diagnostic apparatus according to claim 14,
wherein the processor is configured to generate the three-dimensional ultrasound image of the observation target by performing volume rendering on the observation target which is detected.

16. The ultrasound diagnostic apparatus according to claim 14,
wherein the processor is configured to generate the three-dimensional ultrasound image by reducing the reception signals of a portion other than a portion corresponding to the observation target which is detected.

17. The ultrasound diagnostic apparatus according to claim 1,
wherein the plurality of probe beam former circuits are configured to perform beam forming on the transmission signals by adding delays to the transmission signals for the two or more transducers in the plurality of patches.

18. The ultrasound diagnostic apparatus according to claim 1,
wherein the plurality of probe beam former circuits are configured to perform beam forming on the transmission signals by transmitting the transmission signals without delays added thereto to the two or more transducers in the plurality of patches.

19. The ultrasound diagnostic apparatus according to claim 1,
wherein the plurality of probe beam former circuits are configured to perform beam forming on the reception signals by adding delays to the reception signals for the two or more transducers in the plurality of patches.

20. The ultrasound diagnostic apparatus according to claim 1,
wherein the plurality of probe beam former circuits are configured to perform beam forming on the reception signals by transmitting the reception signals without delays added thereto, which are received from the two or more transducers in the plurality of patches, to the main body beam former circuit.

21. A method for controlling an ultrasound diagnostic apparatus that includes an ultrasound probe including a two-dimensional transducer array in which a plurality of transducers are arranged in each of an elevation direction and an azimuth direction and an apparatus main body connected to the ultrasound probe and performs both two-dimensional scanning and three-dimensional scanning, the method comprising:
dividing the plurality of transducers into a plurality of patches in which one transducer is arranged in the azimuth direction and two or more transducers are arranged in the elevation direction, respectively, in a case of performing the two-dimensional scanning;
dividing the plurality of transducers into a plurality of patches in which one transducer is arranged in the elevation direction and two or more transducers are arranged in the azimuth direction, respectively, in a case of performing the three-dimensional scanning;
performing beam forming on transmission signals and reception signals for the two or more transducers in the plurality of patches in the ultrasound probe;
performing beam forming on the transmission signals and the reception signals for the plurality of patches in the apparatus main body;
generating a two-dimensional ultrasound image based on the two-dimensional scanning;
generating a three-dimensional ultrasound image based on the three-dimensional scanning;
superimposing the three-dimensional ultrasound image on the two-dimensional ultrasound image; and
displaying the two-dimensional ultrasound image and the three-dimensional ultrasound image.

* * * * *